US012741364B2

(12) United States Patent
Schmidt et al.

(10) Patent No.: US 12,741,364 B2
(45) Date of Patent: Sep. 22, 2026

(54) TOOL SUPPLY DEVICE

(71) Applicant: HAZET-WERK Hermann Zerver GmbH & Co. KG, Remscheid (DE)

(72) Inventors: Guido Schmidt, Remscheid (DE); Christian Koschella, Remscheid (DE)

(73) Assignee: HAZET-WERK HERMANN ZERVER GMBH & CO. KG, Remscheid (DE)

( * ) Notice: Subject to any disclaimer, the term of this patent is extended or adjusted under 35 U.S.C. 154(b) by 0 days.

(21) Appl. No.: 19/107,026

(22) PCT Filed: Jul. 14, 2023

(86) PCT No.: PCT/EP2023/069667
§ 371 (c)(1),
(2) Date: Feb. 27, 2025

(87) PCT Pub. No.: WO2024/046646
PCT Pub. Date: Mar. 7, 2024

(65) Prior Publication Data
US 2026/0001215 A1 Jan. 1, 2026

(30) Foreign Application Priority Data
Aug. 31, 2022 (EP) .................................... 22193176

(51) Int. Cl.
*B62B 3/02* (2006.01)
*B25H 3/02* (2006.01)
(Continued)

(52) U.S. Cl.
CPC ............ *B25H 3/028* (2013.01); *B62B 3/005* (2013.01); *B65D 25/105* (2013.01);
(Continued)

(58) Field of Classification Search
CPC ..... B25H 3/028; B62B 3/005; B62B 2202/48; B65D 25/10; B65D 25/105; B65D 81/133;
(Continued)

(56) References Cited

U.S. PATENT DOCUMENTS 5,918,741 A * 7/1999 Vasudeva ............... B65D 73/00
206/234
6,859,854 B2 * 2/2005 Kwong ................. G06F 3/0661
439/43
(Continued)

FOREIGN PATENT DOCUMENTS

AT 13969 U1 2/2015
DE 102007017207 A1 2/2008
(Continued)

OTHER PUBLICATIONS

Extended European Research Report for European Application No. 22193176.9 mailed Feb. 7, 2023, 11pp.
(Continued)

*Primary Examiner* — Bryon P Gehman
(74) *Attorney, Agent, or Firm* — HAUPTMAN HAM, LLP

(57) ABSTRACT

A tool supply device according to the present disclosure is a workshop trolley, a workbench or a tool cabinet. The tool supply device has a housing and containers, for example, drawers, arranged in the housing. At least one tool carrier is provided in the container, which has a receptacle for a tool, wherein the receptacle is assigned a detector for detecting the presence of a tool in the receptacle. According to the present disclosure, the detector has a touch switch with a touch element, wherein the touch element penetrates through an opening in the tool carrier and projects into the receptacle with an active surface. There are receptacles of a first type, wherein the touch element projects from below
(Continued)

through the bottom of a receptacle into the receptacle, and there are receptacles of a second type, wherein the touch element projects laterally into the receptacle.

22 Claims, 28 Drawing Sheets

(51) Int. Cl.

| | |
|---|---|
| ***B62B 3/00*** | (2006.01) |
| ***B65D 25/10*** | (2006.01) |
| ***B65D 81/133*** | (2006.01) |
| ***G01G 19/414*** | (2006.01) |
| ***G01G 19/52*** | (2006.01) |

(52) U.S. Cl.
CPC ......... *B65D 81/133* (2013.01); *G01G 19/414* (2013.01); *G01G 19/52* (2013.01); *B62B 2202/48* (2013.01); *B65D 2255/00* (2013.01); *B65D 2313/04* (2013.01)

(58) Field of Classification Search
CPC ... B65D 2255/00; B65D 2313/04; G06F 3/04; G06F 3/14; G06F 16/16; G01G 19/414; G01G 19/52; G06G 19/414; G06G 19/52
See application file for complete search history.

(56) References Cited

U.S. PATENT DOCUMENTS

| | | | | |
|---|---|---|---|---|
| 7,317,393 | B2 | 1/2008 | Maloney | |
| 7,337,963 | B2 * | 3/2008 | Harper | G06Q 10/087 235/382 |
| 8,172,082 | B2 * | 5/2012 | Edwards | A61M 5/2033 604/189 |
| 8,554,364 | B2 * | 10/2013 | Holmes | A47B 88/90 700/242 |
| 9,349,113 | B2 * | 5/2016 | Bashkin | A47B 57/04 |
| 11,253,088 | B2 * | 2/2022 | Wittig | A47F 5/16 |
| 11,762,500 | B1 * | 9/2023 | Ashcroft | G06F 1/3262 345/156 |
| 12,086,103 | B2 * | 9/2024 | Lin | G07C 9/00182 |
| 2007/0023193 | A1 | 2/2007 | King | |
| 2009/0071854 | A1 | 3/2009 | Martin | |
| 2009/0072029 | A1 | 3/2009 | Martin | |
| 2010/0039513 | A1 | 2/2010 | Glickman et al. | |
| 2012/0203376 | A1 * | 8/2012 | Savage | G06Q 10/087 700/214 |
| 2019/0279288 | A1 | 9/2019 | White et al. | |
| 2020/0323377 | A1 * | 10/2020 | O'Connor | A47G 29/20 |

FOREIGN PATENT DOCUMENTS

| | | | | |
|---|---|---|---|---|
| DE | 102008031372 A1 | | 1/2010 | |
| DE | 102009047084 A1 | | 5/2011 | |
| EP | 1808275 A2 | | 7/2007 | |
| EP | 1663586 B1 | | 9/2008 | |
| EP | 3936285 A1 | | 1/2022 | |
| GB | 2480322 A | * | 11/2011 | B25H 3/028 |
| WO | WO-2016096089 A1 | * | 6/2016 | G06F 3/0447 |

OTHER PUBLICATIONS

International Search Report and Written Opinion for International Application No. PCT/EP2023/069667 mailed Oct. 11, 2023, 16pp.

* cited by examiner

TOOL SUPPLY DEVICE

RELATED APPLICATIONS

The present application is a National Phase of International Application Number PCT/EP2023/069667, filed Jul. 14, 2023, and claims priority of European Application Number 22193176.9 filed Aug. 31, 2022.

FIELD

The present disclosure relates to a tool supply device, for example, a workshop trolley, a workbench or a tool cabinet.

BACKGROUND

Tool supply devices are described in various embodiments. Workshop trolleys, workbenches or tool cabinets are widely used. Workshop trolleys of the usual design have a housing able to be moved on casters, in which a number of containers in the form of drawers are arranged above and below each other. The drawers are mounted on rails on the side and are pulled out of the front of the housing. Workbenches also have a housing with drawers arranged inside.

Tool supply devices have proven themselves in practice. They are used to receive and/or transport a wide variety of tools which are able to be stored in storage systems. In this context, various systems are designed to enable the identification and recording of tools and the seamless registration of tool removal and return processes. In this context, DE 10 2007 017 207 A1 proposes the idea of assigning a fixed storage location to each tool and equipping with a receiver which is able to be coupled with a transponder arranged at the storage location for the exchange of signals, which makes possible to constantly and permanently check whether a tool is in its place or in operation. Furthermore, all authorized users of tools are to be assigned a transponder and access to the tool storage area is only to be possible using the transponder.

By virtue of EP 1 663 586 B1, an inventory monitoring system for monitoring the removal and return of tools is considered part of the state of the art. Each tool storage location includes a uniquely shaped recess for holding a specific tool, whereby the shape of the recess is adapted to the shape of the tool. Furthermore, detection means are provided for detecting the presence of tools and means for transmitting signals from the detection means to a data processing apparatus. The data processing apparatus receives the signals from the detection means and records the removal and return of tools. An output device indicates the presence and/or absence of tools.

Also described in EP 1 808 275 A2 is a tool supply device with a tool carrier that has a recess for receiving a tool, for example, a hand tool. A sensor unit is arranged on a side of the tool carrier opposite the tool-side recess. The sensor unit is designed to detect the presence and/or absence of a tool through the tool carrier.

A method and a system for monitoring the presence of a tool at a given position is also described in DE 10 2008 031 372 A1.

US 2009/0072029 A1 describes an inventory control system for a tool supply device having a plurality of storage locations for inventory items, such as receptacles for tools, as well as a monitoring system for monitoring the removal and insertion of tools from and into the receptacles.

Furthermore, a tool dispensing device is described in AT 13969 U1, in which each tool is assigned a specific location. Each space is assigned a sensor that is connected to an evaluation unit, via which an evaluation of the presence or absence of a tool to be dispensed is carried out.

US 2010/0039513 A1 describes systems for monitoring the stock level of objects based on captured images, for example, of tools in drawers of a tool supply device.

A system for tracking and controlling access to objects is described in U.S. Pat. No. 7,317,393 B2. The system includes a storage unit in the form of a lockable cabinet for storing, dispensing and collecting items. A computer control is coupled to the cabinet and includes a user interface for identifying or verifying a user. The computer control system also monitors the removal and return of items.

The reliability of tool detection in practice is in need of improvement. Non-contact tool detection and data transmission within the system has limitations, and is important to check that tools are complete before and after work in sensitive areas, such as assembly, maintenance and/or repair work on aircraft. Lost tools are able to cause significant damage to an aircraft. As part of measures against Foreign Object Damage (FOD), checking the tools for completeness as well as to track them to avoid damages is necessary.

SUMMARY

The object of the present disclosure is to improve a tool supply device with tool identification and monitoring in terms of its overall reliability and practicality, with a simple design.

This object is achieved according to the present disclosure by tool supply device.

Embodiments and modifications of features of the tool supply device, which individually or in combination advantageously refine the tool supply device in terms of function and application, also result from the description and the accompanying drawings.

A tool supply device according to the present disclosure is a workshop trolley, a workbench or a tool cabinet. The tool supply device has a housing and containers arranged therein, wherein at least one tool carrier is provided in a container, which tool carrier has several receptacles for tools. Each receptacle is assigned a detector to detect the presence of a tool in the receptacle. For example, the containers are drawers or compartments.

According to the present disclosure, the detector has a touch switch with a touch element, wherein the touch element extends through an opening in the tool carrier and projects with an active surface into the receptacle for a tool. The active surface is able to be provided on the front of the touch element, for example, but also on a side surface of the touch element, or formed by the touch element. The active surface extends into the receptacle in such a way that the touch switch is activated by an inserted tool and deactivated when the tool is removed.

According to the present disclosure, there are receptacles of the first type in which the opening is an aperture penetrating through the wall of the tool carrier below the receptacle, wherein the touch element projects from below through the bottom of a receptacle into the receptacle. Furthermore, there are receptacles of the second type, in which the touch element projects into the receptacle from the side, i.e., from a side wall. For example, the opening for the touch element is an aperture or cutout that penetrates through the wall of the tool carrier to the side of the receptacle. Furthermore, according to the present disclosure, a holder element is arranged in at least one receptacle, which acts as a pressure amplifier for a tool.

Receptacles of the first type and receptacles of the second type in the tool carrier differ in the arrangement and design of the aperture for the touch element. In the receptacles of the first type, the opening for the touch element is an aperture in the wall of the tool carrier below the receptacle. The touch element is guided from below through the bottom of the receptacle and projects into the receptacle. When a tool is inserted, the touch element is moved vertically and pressed downwards by the weight. When the corresponding tool is removed, the touch element moves upwards or towards the top.

Receptacles of the first type are intended for hand tools such as torque wrenches, hammers or pliers.

For tool receptacles of the second type, the opening for the touch element is an aperture through the wall of the tool carrier at the side of the receptacle. The aperture is able to extend from the bottom of the tool receptacle into the side wall of the receptacle. The touch element projects laterally through the wall of the tool carrier into the receptacle and contacts an inserted tool from the side. Here, the touch element is placed on a section of the tool for installation, which extends adjacent to the side wall of the receptacle and parallel thereto.

The receptacle of the second type is intended for tools such as sockets, socket wrenches or socket inserts or screw bits.

The touch switch is the detection element that is activated by pressing on its touch element and deactivated by releasing so as to detect the presence or absence of a tool in a receptacle. The weight of a tool in a receptacle presses the button element of the touch switch to activate. When pressed, the touch switch creates a connection which is then disconnected again when the touch switch is released, i.e., when a tool is removed. A spring integrated in the touch switch acts on the touch element, causing the touch switch to return to its original position.

The position of the touch element projecting into the receptacle is the starting position of a touch switch; the position of the touch element lowered or pressed by a tool is the trigger position of the touch switch, whereby a signal is generated and transmitted to a data processing unit.

For receptacles of the first type, a tool comes into contact with the active surface of the touch element projecting through the bottom of a receptacle and presses down. For receptacles of the first type, an inserted tool comes into contact with the active surface of the touch button element projecting through an aperture in the side wall of the receptacle and pushes or presses the touch button element to the side.

The present disclosure utilizes an electro-mechanical detection of a tool in a receptacle, in which the detector or the detector's touch switch comes into contact with a tool and is activated directly by the tool itself.

The detection of the presence of a tool works reliably. Disturbing influences are hardly relevant. For example, a dirty tool does not affect the effectiveness of the detection. Manual marking or sensor markers on the tools themselves are not necessary.

Advantageous embodiments of a touch element provide that the touch element is a tappet, for example, a spring-loaded tappet or a leg, or a spring leg or a lever, or a spring lever.

The touch elements, for example styli, are able to have a specific surface contour adapted to a tool type in order to be able to better sense the position of the tools. For example, the surface contour is able to be matched to a hexagon socket screwdriver or a hexagon socket screwdriver.

A further advantageous aspect of the present disclosure provides that the at least one touch switch is arranged in a support body. In at least one embodiment of the present disclosure, several touch switches are arranged in a support body, advantageously in series and positioned on a printed circuit board. The circuit board with the touch switches is received in the support body and is arranged with the support body in the tool carrier. In at least one embodiment of the present disclosure, the arrangement is such that the individual touch elements of the touch switches each penetrate through an opening in the tool carrier and project into the receptacle with the respective active surface. The support body is able to form part of the tool carriers. In at least one embodiment of the present disclosure, in the case of receptacles of the second type, parts of the support body form side surfaces of the receptacle of the second type.

The opening is an aperture in the wall of the tool carrier in the area below the receptacle for the first type of receptacle. The opening is designed to match the dimensions of the touch element of a touch switch so the touch switch is able to be easily moved back and forth in the opening. The tool carrier itself is formed by a soft foam insert. In at least one embodiment of the present disclosure, a receptacle has a recess in the tool carrier that is adapted to the shape of a specific tool.

For receptacles of the second type, the opening is an aperture penetrating through the wall of the tool carrier on the side of the receptacle or a side cutout in tool carrier. The touch element is configured as a lever or spring leg, for example, a spring-loaded lever, and projects laterally into the receptacle.

Identification features for the individual tools are able to be assigned to the receptacles in the tool carrier. This is able to be a label, for example, a tool article number, but also a symbol or a pictogram. Using the identification features, a tool is able to be easily and quickly assigned to a receptacle.

According to the present disclosure, combining several touch switches is advantageous, wherein touch switches are provided whose touch element projects from below into the receptacle, that is to say through the bottom of a receptacle, and detectors are also provided with touch switches whose touch element extends laterally into a receptacle, wherein the touch elements penetrate through openings in the form of apertures in a side wall of the receptacle of the tool carrier.

One aspect of the present disclosure provides that the touch switch is supported at least indirectly on the bottom of a container, for example, a drawer. This is advantageous for force introduction, sensitivity and triggering of the detectors. One or more touch switches is able to be arranged in a support body or received in a support body. Above the support body, the touch switch is supported indirectly on the bottom of a container. Furthermore, a support body is able to be supported at least indirectly on the bottom of a container.

An advantageous embodiment provides for a touch element and a touch switch, respectively, to be integrated in a housing with the touch element. The housing forms the support body for the touch element and improves functional reliability. The housing with the integrated stylus is advantageously located directly on a printed circuit board. In at least one embodiment of the present disclosure, the housing ensures the functionality and mechanical mobility of a touch element.

In at least one embodiment of the present disclosure, the touch switch is attached to a circuit board which is arranged on the bottom of the container below the tool carrier. A tool carrier has several receptacles, with each receptacle assigned to a detector. Advantageously, all detectors are arranged in a horizontal plane. This increases the reliability and practicality of the detectors and the combination of several detectors in one detector area. A further advantage is that the touch elements, as well as the circuit boards, do not require any additional or only insignificantly more space in a container, since the components are positioned in or under the tool carrier, for example, in a tool carrier formed by a soft foam insert.

The touch switches of the detectors are triggered or activated by the weight of a tool. If the weight of a tool itself is not sufficient, the present disclosure provides that a holder element is arranged in at least one receptacle, for example, a clamp-shaped holder element or a magnetically acting holder element, i.e., a magnet holder element. The holder element is intended and configured such that a tool must be placed into a receptacle by means of a certain amount of force. This force activates the touch switch via the tool. The holder element acts as a pressure amplifier of the tool in the receptacle. The holder element holds the tool in the receptacle and thus ensures that the touch button remains in the release position as long as a tool is arranged in the receptacle. By increasing the pressure on a tool using the holder element, the tool is fixed in a receptacle.

With lighter tools, holder elements in the form of magnetic holders are integrated into a receptacle in order to press the tools into position on the touch switches. This is also advantageous in the event of vibrations and/or movements of the tool supply device, for example, a workshop trolley.

The arrangement or number of receptacles with integrated holder element, which acts as a pressure amplifier for a tool, is coordinated with the placement of the tools to be received in the container or drawer, with respect to geometry and/or weight. The same applies to the receptacles of the first type and the receptacles of the second type.

A data processing unit is provided for capturing and evaluating the signals generated by the detectors and for further processing them. The unit is intended and configured for receiving signals from the detector(s) and to record and document the removal and return of a tool.

The tools are identified using the data processing unit. This is done by evaluating and processing the signals received by the detectors and assigning them to the receptacles in the tool carrier.

The data processing unit is also able to be used to capture tool usage data, such as the issue duration or time, but also inspection intervals of the tools or calibration and/or tool status data as well as tool user data.

When a tool is removed from the receptacle of the tool carrier as well as when a tool is returned to the receptacle, a signal is generated by the detector assigned to the respective receptacle by moving the touch element via the touch button. These signals are registered via the software and electronics that form part of the data processing unit. The absence and presence of a tool is transmitted to an evaluation unit; for example, the information is able to be displayed on a Wi-Fi-connected device. This works both as a single-user solution for a tool supply device and as a server solution with an overall overview of all connected tool supply devices, for example, a large number of workshop trolleys, workbenches or stationary tool cabinets. The tool is able to be identified and, in addition to the information such as tool type and age, etc., further information is able to be stored, for example, test, inspection or calibration intervals or time of use.

The tool inventory is monitored and managed automatically. An automatic and immediate inventory of the tools in the tool supply device is carried out. Access control as well as trackability is simplified. Identification and management of tools takes place in real time. User recognition at the tool supply device is able to be achieved by means of a personalized access badge or a PERSONAL code. The identification and management system INCLUDES system software that is activated when the tool supply device is used. A tool is able to be removed by the user or returned after use. The removal or return is saved. ASSOCIATED deployment processes and times are determined and archived. An automatic inventory is able to be taken when individual drawers are closed or during a locking process of the tool supply device.

An advantageous embodiment provides that the outline of one or more tools is shown on the circuit boards. For the viewer, the outline represents a curve that separates the object from its surroundings. This measure facilitates the equipping of the circuit boards themselves but also the arrangement of the tool carriers on the circuit boards in a drawer.

Of course, within the scope of the present disclosure, circuit boards are also able to be used where the outline of the tools is not shown on the surface of the circuit boards.

In at least one embodiment of the present disclosure, several circuit boards are arranged next to each other on the bottom of a drawer. In this case, each printed circuit board has a module size adapted to the dimensions of the container, so that the printed circuit boards together cover the bottom surface is useful. In at least one embodiment of the present disclosure, two, three or four printed circuit boards are arranged next to each other on the bottom surface of a container.

One measure that further increases the practicality of the tool-provisioning device is that one or more cable-carrying devices are arranged in the housing for electrical connecting lines. The cable-carrying device is used for holding and guiding electrical connecting cables between the circuit boards, in the containers as well as between the circuit boards and the data processing unit. The cable-carrying device allows movement of the electrical connection cables, when pulling out and pushing back the drawers.

In practice, several movable cable-carrying devices are arranged in the housing. These carry the power supply line and the data communication lines to each individual container, for example, each individual drawer. Accordingly, one cable-carrying device is provided for each container.

In the housing itself, a cable duct, for example, made of sheet metal, i.e., a sheet metal component, is firmly attached, or welded. The individual movable cable-carrying devices, including electrical lines, i.e., cables, are screwed or riveted to this channel during assembly.

In at least one embodiment of the present disclosure, the cable arms of the cable-carrying device are fixed to the containers with detachable connecting elements, for example, screws. This facilitates the installation and also any replacement of the cable-carrying device or both.

A further advantageous aspect of the present disclosure provides a locking system by means of which the containers are able to be centrally locked in the housing. In at least one embodiment of the present disclosure, the locking system is able to be operated from a central lock unit. In at least one embodiment of the present disclosure, the locking system is able to be opened or closed contactlessly, for example, by means of an RFID transponder. The electronic locking system has an electric actuator by means of which a locking bar is able to be moved and the locking is able to be transitioned to the open or closed position. Operation is via a user identification, for example, a PIN code or an ID card.

This is able to be an RFID sensor or transponder or similar identification tags (tokens). A suitably configured transceiver system is also able to be used to capture tool user data.

The locking system is also able to be switched to the locked state automatically by the software. This is able to be done on a time-controlled basis, for example. For this purpose, a timer is integrated so that the tool supply device is automatically closed and transitions into the locked state after a predetermined period of time in which the tool supply device has not been used.

The locking system belonging to the tool supply device according to the present disclosure has a mechanical emergency release, via which the locking of the tool supply device is able to be actuated in the event of failure of the electronic locking system. In at least one embodiment of the present disclosure, the emergency release includes a cylinder lock.

The tool supply device has functional electronics, wherein the functional electronics control at least one actuator. The actuator is intended for operating a locking bar of the locking system.

The functional electronics are also able to have a wireless communication module, for example, a Bluetooth or Wi-Fi module.

The wireless communication module is an integral part of the data processing unit. This way, the tool supply device is able to provide a device-related Wi-Fi network with a wireless access point, i.e., a wireless access point that acts as an interface for wireless communication devices. This way, communication between the tool supply device and a mobile device, such as a smartphone or smart tablet, or other operators is possible. Several tool supply devices are also able to be connected together in a network so that central or decentralized monitoring is possible.

In this context, an advantageous embodiment provides for a display that communicates with a data processing unit. The display is able to indicate the presence or absence of tools, as well as tool usage data and/or user data. The display is arranged or integrated in a functional area on the tool supply device. The display displays the status of the tools and/or the closing state of the tool supply device and similar, such as the battery charge level. Information about peripheral components of the tool supply device, for example data processing cables, like respective presence or absence, as well as any operating modes, are also able to be detected and displayed via the data processing unit and the display.

The tool supply device is equipped with an electrical power supply. The energy supply is conveniently provided by a power storage device, for example, a lithium-ion battery. The accumulator is able to be mounted in an easily accessible mount on the tool supply device. This mount allows for easy and quick replacement of a battery. In practice, the battery is covered by an encasing housing. In at least one embodiment of the present disclosure, the housing has a protective function, but also improves the appearance. Furthermore, the battery housing is able to be designed to be lockable to prevent unauthorized access to the battery.

Furthermore, at least one signal element to be provided in or on the tool supply device, which is intended and configured to signal the presence or absence of a tool in a container is advantageous. In at least one embodiment of the present disclosure, the signal element is an optical signal element, in the form of a light element, for example a light-emitting diode (LED). The signal element is able to be arranged in a container, in the soft foam insert of a drawer.
Acoustic signaling elements are also able to be used.

In at least one embodiment of the present disclosure, the signal element or a signal unit having several signal elements is arranged in an edge protection element provided on the housing. In at least one embodiment of the present disclosure, the edge protection element extends in the longitudinal direction of a side edge of the housing, specifically on the front side of the housing. Signal elements, for example, LEDs, into at least one of the edge protection elements on the side of the housing are integrated. Such an edge protection element acts as impact or ram protection and is made of elastic material, for example, plastic material. Recesses are provided in the edge protection element to accommodate the signal elements or the signal unit with several signal elements. In at least one embodiment of the present disclosure, the recesses are located horizontally at the same height as the upper edge of a container, for example, a drawer, and at the same height as the drawer handles. Each signal unit therefore represents the adjacent drawer and thus the tools contained in the respective drawer. The tool inventory is displayed visually. A green signal indicates that the placement of tools in the respective drawer is complete. A red signal indicates that the tool set in the drawer is not complete. This type of display is advantageous because the display quickly and easily shows the user whether tools are missing and in which drawer. The arrangement of the signal elements or the signal unit at the front adjacent to the respective drawer level is clearly visible from the main working direction in front of the workshop trolley.

It is also possible that the signal element is arranged on the container, for example the front surface of a drawer. Furthermore, the signal element is able to be arranged within the display or the functional area of the tool supply device.

The visualization via at least one, a plurality of signal elements, for example, in the form of optical control lights (LEDs), quickly shows the user whether all tools are present in a drawer. For example, signals with different colors are able to be generated. A red light for example indicates that a tool is missing, while a blue or green light signals to the user that all tools are present. For example, LEDs with color changing function are used.

At least one signaling unit is provided in the context of the present disclosure, which is set up and intended to signal the closed state of the tool provision device and/or the battery charge state of an electrical energy supply unit and/or the completeness of the tools, i.e. the tool inventory. Such a signal unit is provided on or in a handle area or a functional area on the housing of the tool supply device.

In the embodiment, the signal element, the light-emitting diode, is connected to a circuit board, and is fixed in place using a mount that carries the signaling element and is screwed onto the circuit board. In at least one embodiment of the present disclosure, the mount is cylindrical and has the shape of a housing. When the signal element is arranged in a container, the mount extends through the tool carrier in the container. The mount with the integrated signal element, a light-emitting diode, extends through an opening in the tool carrier to the surface of the tool carrier. This makes the signaling element highly visible to the user. A mount with an integrated LED is also called an LED dome.

A further aspect of the present disclosure provides that at least one touch switch with the integrated touch element is configured and set up to receive a plug element of a cable, for example a USB cable. The touch switch has a plug opening for this purpose. The touch element is configured to be actuated by inserting the plug element. For example, the touch element has a correspondingly configured inclined surface so that the touch element is pressed downwards when the plug element is inserted and the touch switch or detector is triggered. This way, the presence of electrical cables, for example, data communication cables, in the tool supply device are able to be monitored and queried. In at least one embodiment of the present disclosure, a receptacle is also provided in the tool carrier for such cables, wherein a correspondingly configured detector with a touch switch and the touch element is assigned to said receptacle.

A further development of the tool supply device according to the present disclosure provides that at least one container, for example, a drawer, is equipped with a weighing system. The weighing system includes load cells and is intended and configured to measure the weight of the tools arranged in the receptacle. The weighing system is coupled accordingly with the functional electronics, which is designed to make a comparison between an actual weight and a target weight of the tools in a container. This way, the weighing system is able to be used alternatively and/or in addition to check the tools in at least one drawer for placement and completeness. For this purpose, the actual weight of the tool carrier is compared with a specified target weight of a tool carrier fully equipped with tools via the weighing system and an error message is displayed if there is any deviation.

The scale drawer or the weighing system integrated in the drawer and its functional electronics is coupled to the data processing unit and the signaling unit as well as the signaling elements for visualizing whether the placement of tools in a scale drawer is complete. In at least one embodiment of the present disclosure, this is done via the signaling elements of the signaling unit, which indicate the respective placement status as correct or complete or incorrect or incomplete. For this purpose, signal elements are arranged adjacent to the drawer in an edge protection element provided on the housing.

BRIEF DESCRIPTION OF THE DRAWINGS

The present disclosure is described in more detail hereinafter on the basis of drawings. In the figures.

DETAILED DESCRIPTION

Figure 1:
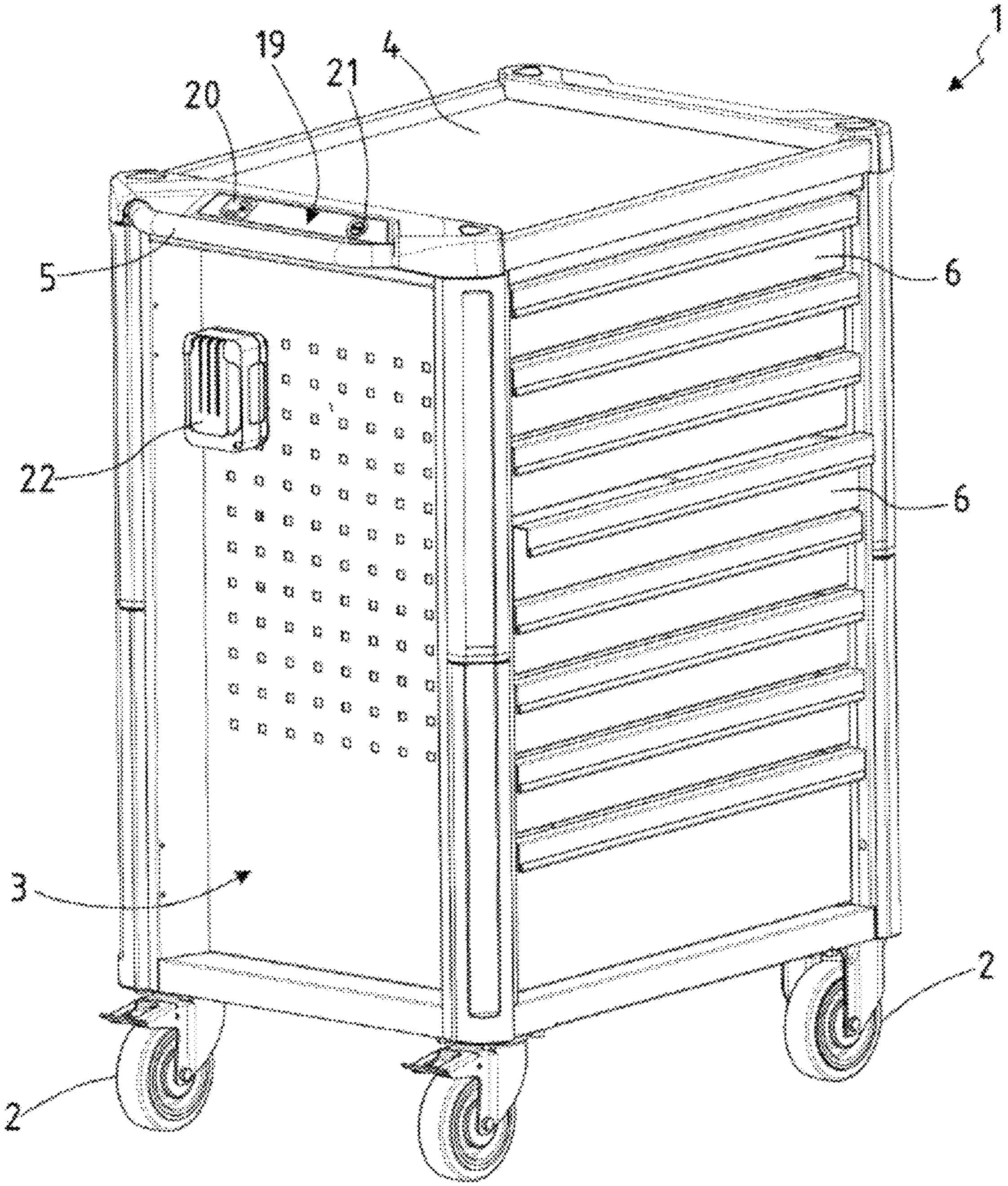
FIG. 1 is a view of a workshop trolley in perspective in accordance with at least one embodiment.

In the figures, the same reference numerals are used for identical or functionally corresponding components or component parts of the tool supply device as well as parts thereof, even if a repeated description is omitted for reasons of simplicity.

FIG. 1 shows a tool supply device in the form of a workshop trolley 1. Such a workshop trolley 1 is used to hold and store tools, for example in assembly or repair shops in the agricultural, aviation or marine industries.

Workshop trolley 1 has a cabinet- or frame-like housing 3 mounted on casters 2, with a cover plate 4. A handle 5 is provided on one narrow side of the workshop trolley 1 or the housing 3, which has a rectangular horizontal cross-section. The housing 3 forms the supporting body of the workshop trolley 1. In the housing 3, a number of containers in the form of drawers 6 are arranged vertically one above the other. The drawers 6 are able to be moved on guides provided on drawer supports in the housing 3. Each drawer 6 is able to be locked into place by means of a locking device in the housing 3.

Figure 2:
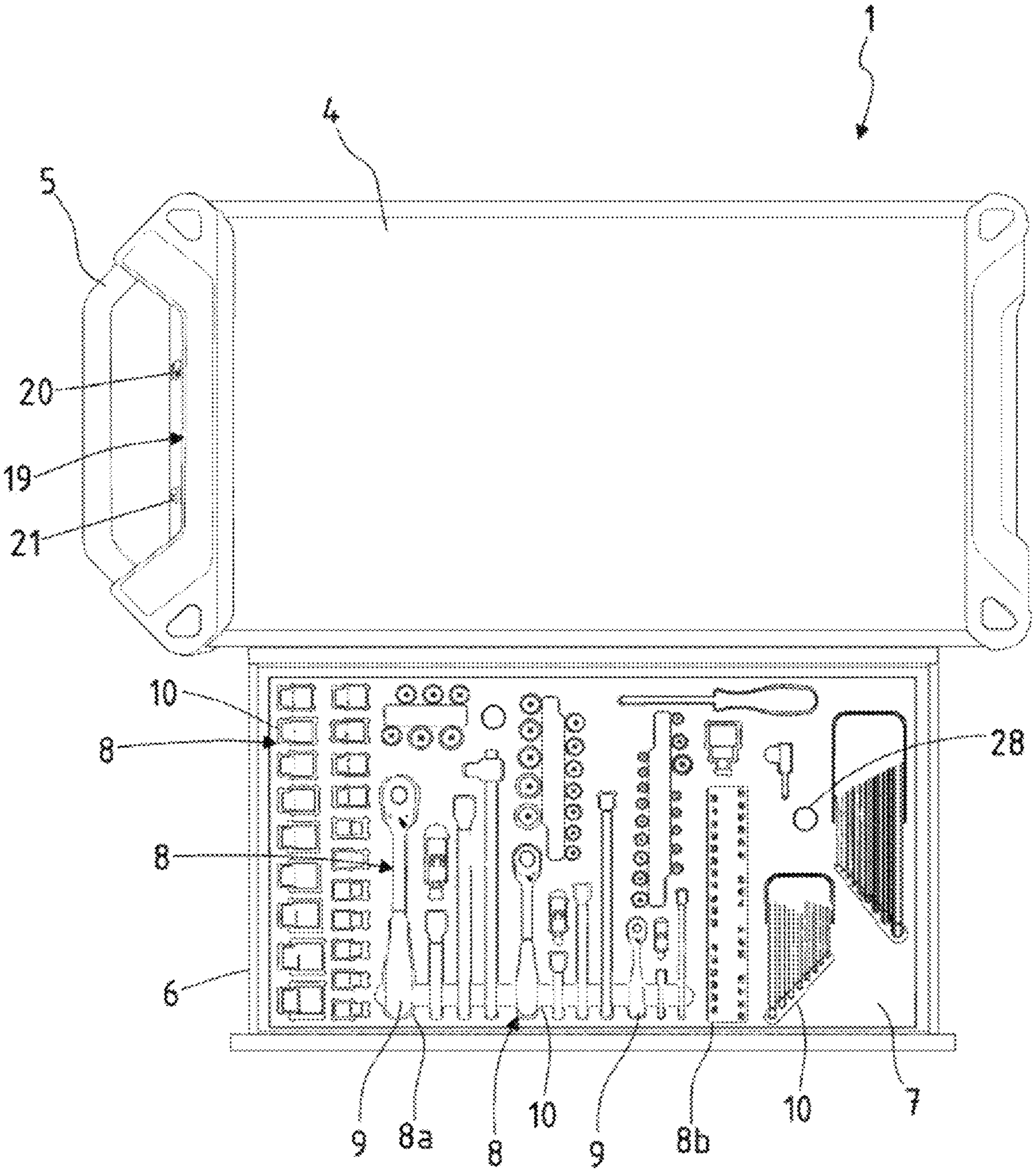
FIG. 2 shows the workshop trolley with an extended drawer in a top view in accordance with at least one embodiment.
Figure 7:
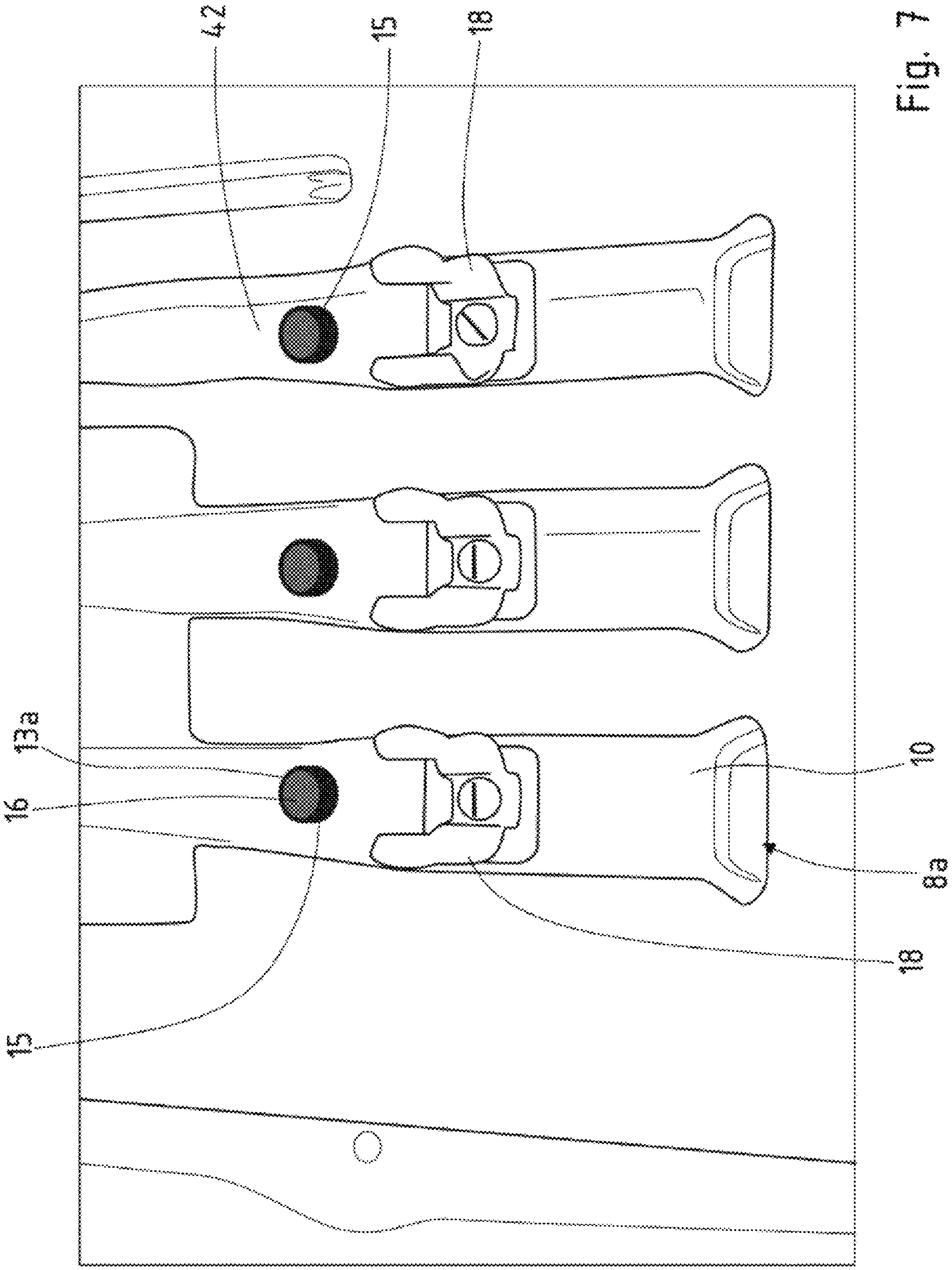
FIG. 7 shows an enlarged section of a tool receptacle in accordance with at least one embodiment.
Figure 8:
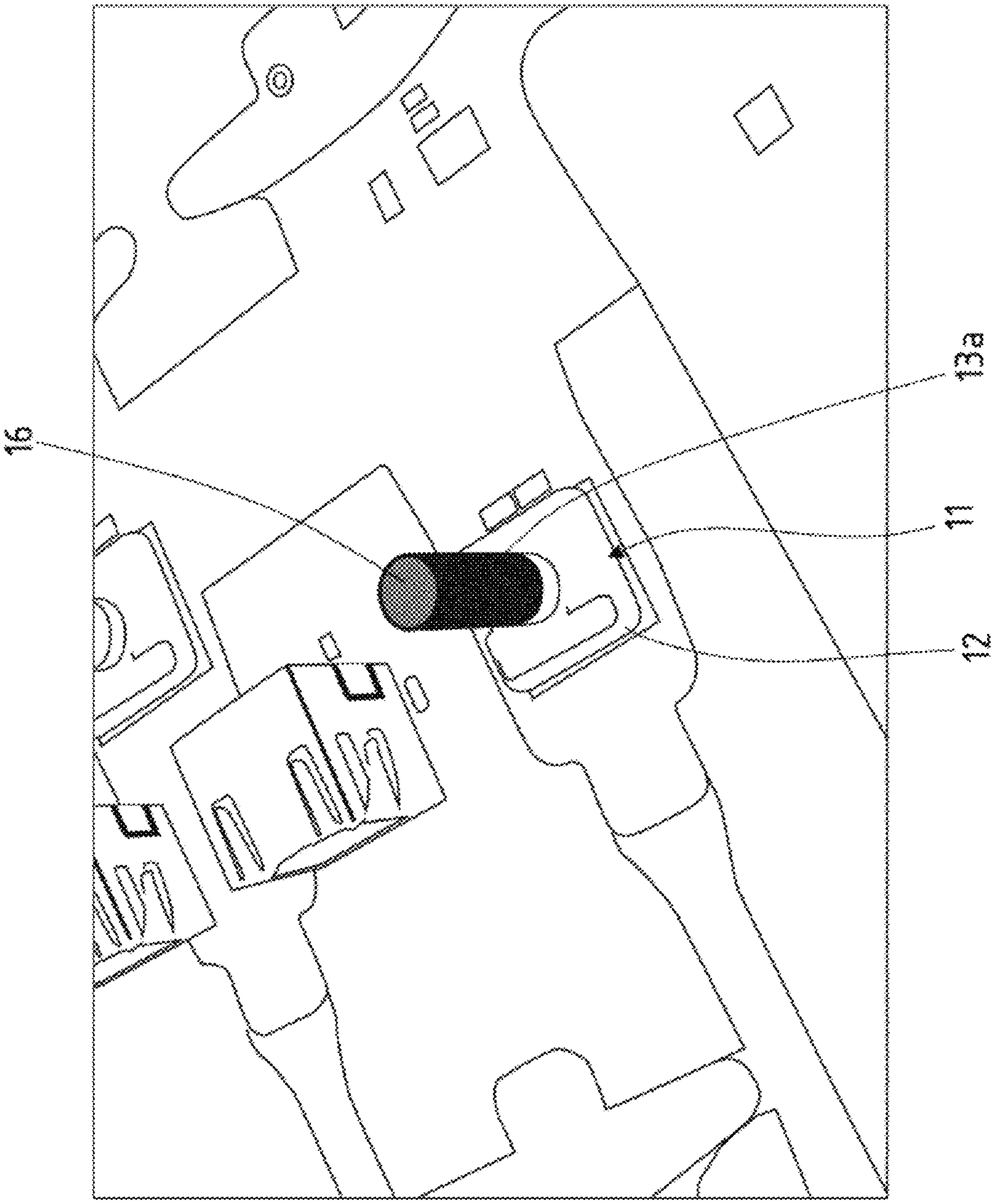
FIG. 8 a view of a touch switch in accordance with at least one embodiment.
Figure 9:
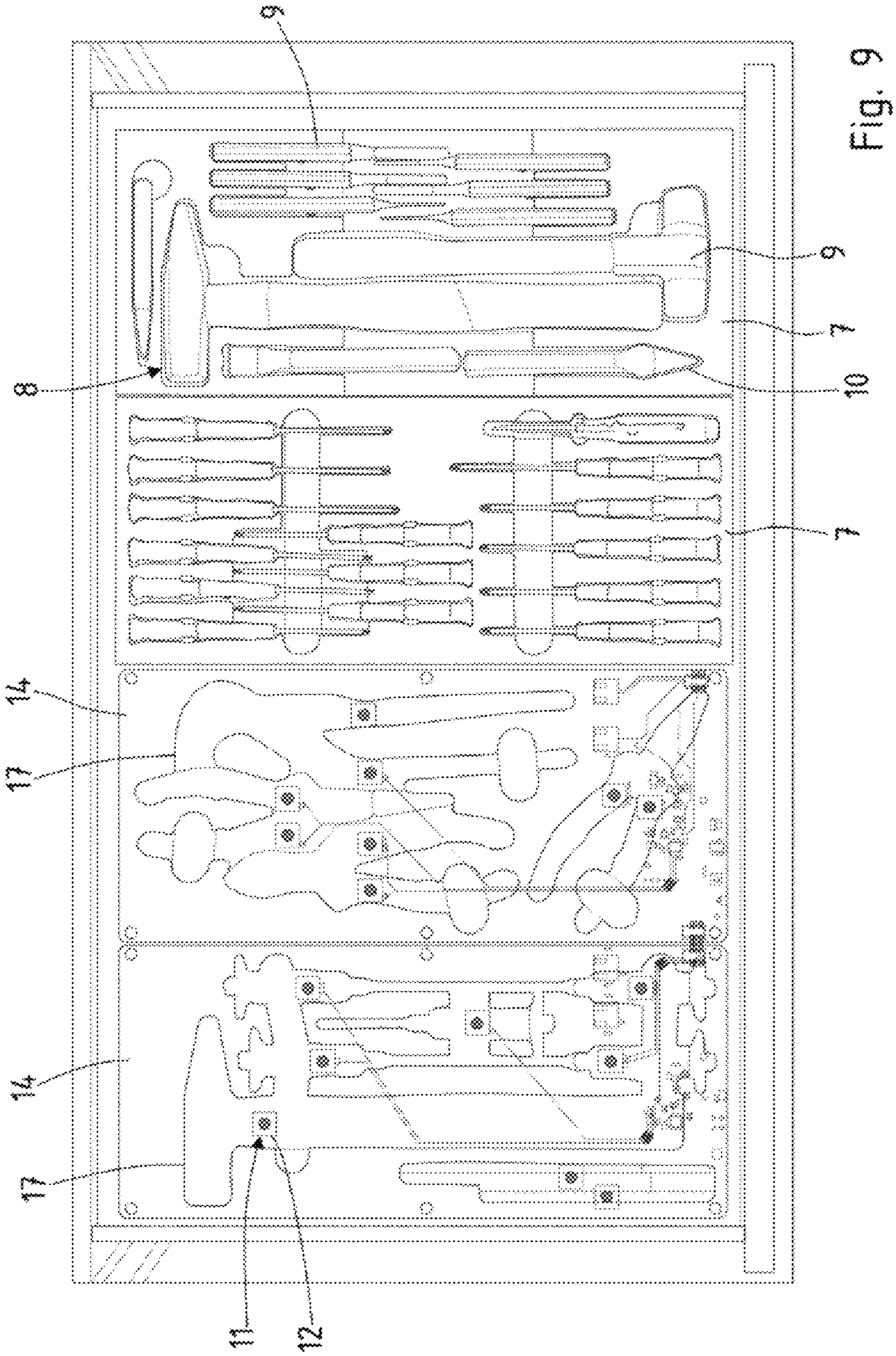
FIG. 9 shows a view into the tool drawer with an illustration of the circuit board assembly in the left half of the drawer and a tool carrier equipped with tools in the right half of the drawer in accordance with at least one embodiment.

The workshop trolley 1 with a drawer 6 pulled out of the housing 3 is illustrated in FIG. 2. A tool carrier 7 is arranged in the drawer 6. The tool carrier 7 is formed by a soft foam insert. In the tool carrier 7, receptacles 8 are provided for one tool 9 each (see also FIG. 3, FIG. 4 to FIG. 6 and FIG. 10). A receptacle 8 has a recess 10 adapted to the shape of a specific tool 9 in the tool carrier 7, and is also possible to arrange several tool carriers 7 in drawer 6, which complement each other and cover the bottom of drawer 6. In this regard, reference is also made to the illustration in FIG. 7.

The workshop trolley 1 is equipped with a tool identification and management system. This enables the automated monitoring and management of tool inventories. The tool identification and management system has a data management unit along with peripheral devices, which receives, processes and delivers data, thus automatically carrying out the necessary data processing.

The tool carriers 7 arranged in the drawers 6 each include a soft foam system and have a plurality of receptacles 8 for different tools 9. In general, the receptacles are marked with the reference numeral 8. There are receptacles 8*a* of the first type and receptacles 8*b* of the second type. The individual receptacles 8, 8*a*, 8*b* are each formed by a recess 10 in the tool carrier 7 adapted to the shape of a specific tool 9. The recesses 10 are formed by depressions in the soft foam inserts of the tool carriers 7. Each receptacle 8, 8*a*, 8*b* is assigned at least one detector 11 which captures the presence of a tool 9 in the receptacle 8, 8*a*, 8*b*.

The detector 11 has a touch switch 12 with a touch element 13 in the form of a spring-loaded tappet 13*a*. The touch switches 12 are each fastened below the receptacles 8, 8*a*, 8*b* on a circuit board 14 (FIG. 7 and FIG. 10), which are arranged on the bottom of the drawers 6 below the tool carriers 7. This way, the touch buttons 12 are indirectly supported on the bottom of a drawer 6. The touch element 13 of the touch switch 12 passes through an opening 15 in the tool carrier 7. For receptacles 8*a* of the first type, the opening 15 is an aperture penetrating through the wall of the tool carrier 7 below a receptacle 8*a* and is circular in cross-section. The diameter of the opening 15 is dimensioned such that a touch element 13 or the tappet 13*a* is guided into the opening 15 and is easily able to be moved back and forth. The length of the tappet 13 is greater than the wall thickness of the tool carrier 7 below the receptacle 8*a*, so that the tappet 13*a* with an active surface 16 projects through the bottom 42 of a receptacle 8*a* into the receptacle 8*a*. The active surface 16 is formed on the front of the touch element of the tappet or is formed by the front of the tappet 13*a*. The touch element 13 or the tappet 13*a* protrudes with its front or with the active surface 16 opposite the bottom surface of a recess 10.

Each tool carrier 7 has several receptacles 8*a* and 8*b*, each of which is assigned at least one detector 11. All detectors 11 are arranged in a horizontal plane and form a keypad. The printed circuit boards 14 are carriers for the pushbutton switches 12 and are used for their mechanical mounting and electrical connection. For this purpose, the circuit boards 14 are equipped with corresponding conductive connections and conductor tracks.

To facilitate the allocation of the tool carriers 7 and the installation of the circuit boards 14 in a drawer 6 as well as the allocation of the tool carriers 7, the outlines 17 of the respective tools 9 are shown on the circuit boards 14. This is able to be seen in the illustrations in FIG. 4 and FIG. 7. In at least one embodiment of the present disclosure, several circuit boards 14 are arranged next to one another on the bottom of the drawer 6. Each circuit board 14 has a module size adapted to the dimensions of the drawer 6, so that the circuit boards 14 together cover the bottom area. The individual circuit boards 14 are electrically connected to one another. The connection to the data processing unit is established via interfaces using electrical connecting cables. For this purpose, cable-carrying devices 25 are arranged in the housing 3 for electrical connecting lines, for example, for the connecting line between the printed circuit boards 14 and the data processing unit. A cable-carrying device 25 is able to be seen in FIG. 4 to FIG. 6. The cable-carrying device 25 has two support arms 26, 27 connected to each other by a hinged joint. Electrical connecting cables are held and guided via the cable-carrying device 25 so that they are able to follow the movement without interference when a drawer 6 is pulled out and pushed in.

The touch element 13 of the touch switches 12 protrude with their active surfaces 16 from the bottom 42 of a recess 10 so that they project into a receptacle 8*a* of the first type. The tappet 13*a* of a touch switch 12 is pressed downwards by a tool 9 inserted into a receptacle 8*a*. This generates a signal and detects the presence of the tool 9 in the receptacle 8*a* of the first type. The weight of a tool 9 located in the receptacle 8*a* presses down the tappet 13 of the touch button 12 and activates it. When a tool 9 is removed, the touch element 13 is released. The connection at touch button 12 is interrupted. This signal detects that a tool 9 has been removed from a receptacle 8 and is missing. The touch switches 12 are therefore activated or deactivated by the direct contact of the touch element 13 with a tool 9.

In the case of lighter tools 9, pressure amplifiers in the form of holder elements 18 are incorporated into the receptacles 8. Holder elements 18 are able to be designed as clamp-like holder elements. A holder element 18 has a spring clip with spring legs arranged in a receptacle 8. Such a holder element 18 is able to be seen in FIG. 7. A tool 9 is able to be inserted into a receptacle 8 by applying a certain amount of force to overcome the spring force of the holder element 18. This pressure activates the corresponding touch switch 12 through the contact of the tool 9. The holder element 18 holds the tool 9 reliably in the receptacle 8 and ensures that the touch button 12 remains in the release position. This is advantageous for lighter tools 9, so that they are held in the receptacles 8 even in the event of a shock, for example during the transport of workshop trolley 1.

Another embodiment of a holder element 18 is magnetically acting. A magnetically acting magnet holder element is designed as a permanent magnet and is placed in, below or to the side of a receptacle 8. The magnetic force of the magnetic holder element draws a tool 9 into a receptacle 8 and increases the pressure against a touch button 12 and fixes the tool 9 in a receptacle 8.

For receptacles 8*a* of the first type, the opening 15 is an aperture penetrating the wall of the tool carrier 7 below a receptacle 8*a*. The touch element 13 of the touch switch 2, which is designed as a tappet 13*a*, penetrates through the opening 15 from below through the bottom 42 of the receptacle 8*a* and protrudes with its front active surface 16 opposite the bottom surface of a recess 10 and projects into the receptacle 8*a*.

Figure 12:
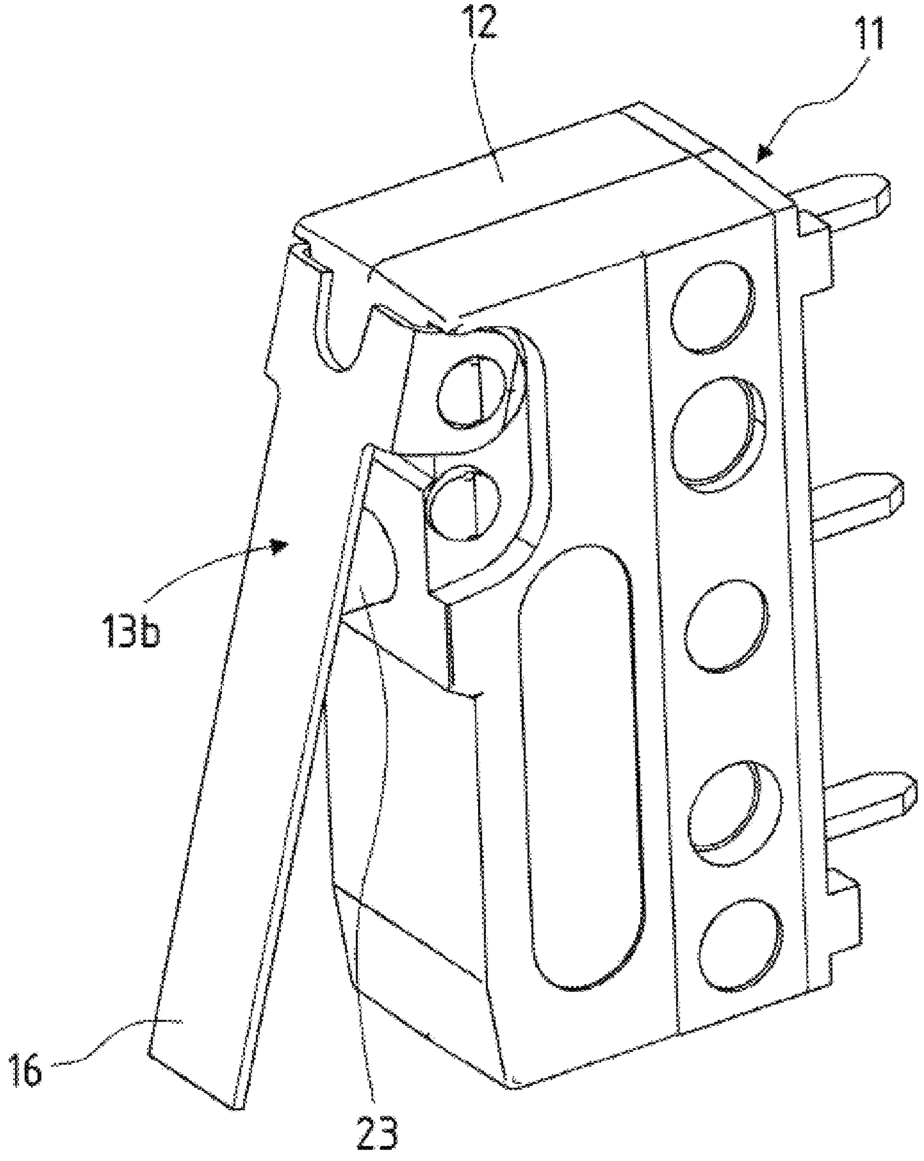
FIG. 12 is a view of a further embodiment of a touch switch in perspective in accordance with at least one embodiment.
Figure 20:
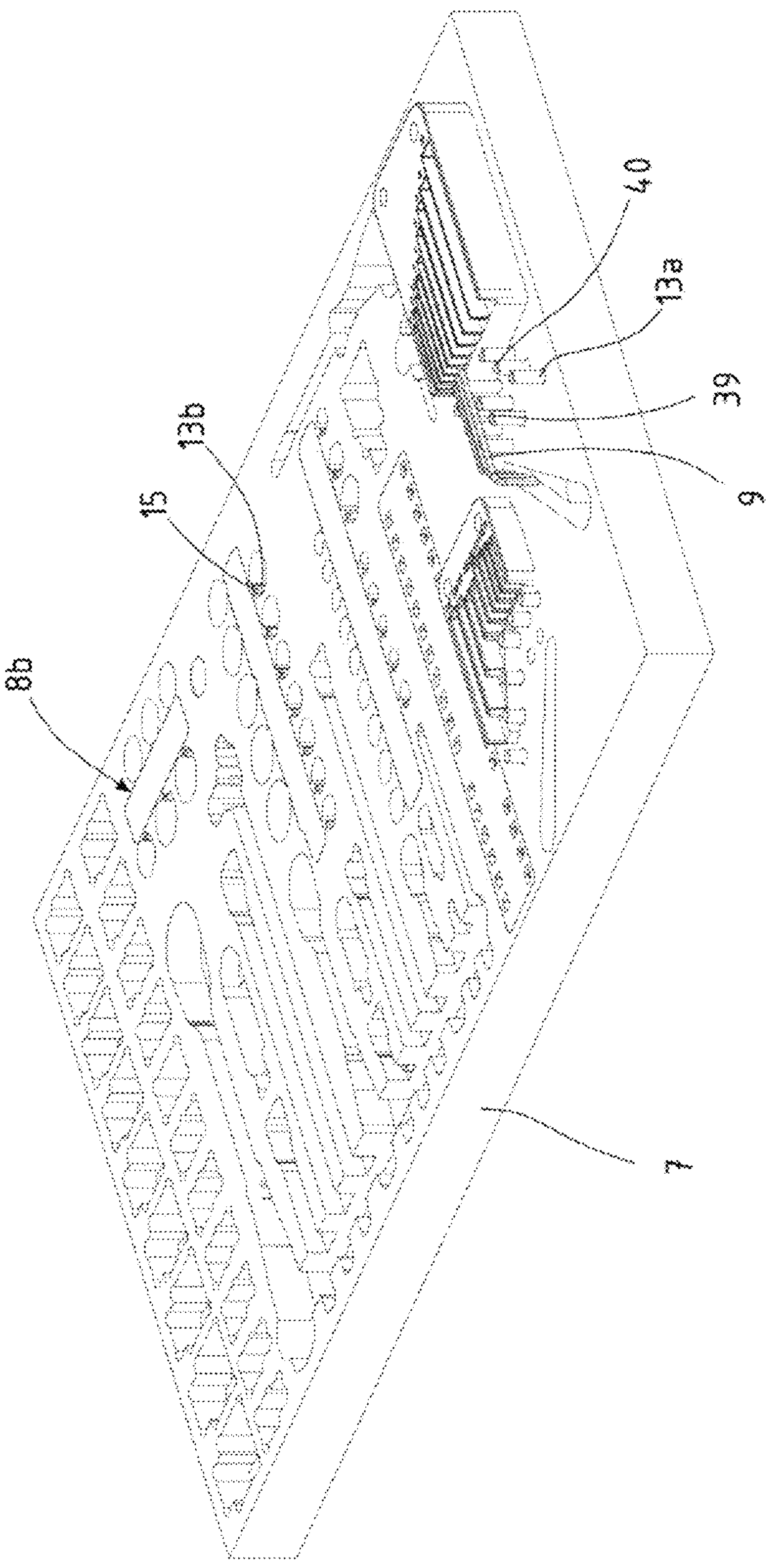
FIG. 20 is a perspective view of a tool carrier partially equipped with tools in accordance with at least one embodiment.
Figure 39:
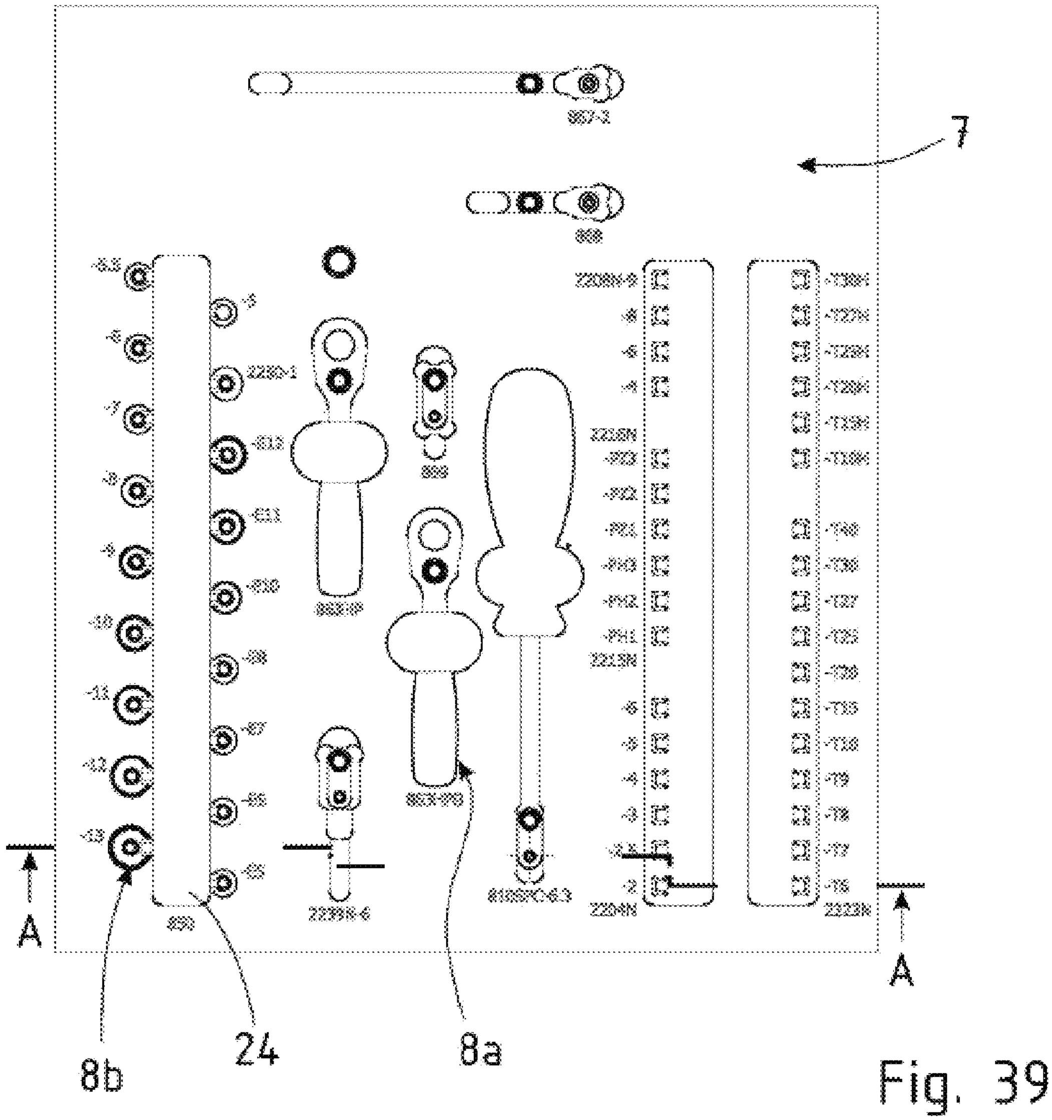
FIG. 39 a plan view of a tool carrier in accordance with at least one embodiment.

Furthermore, there are receptacles 8*b* of the second type (see also FIG. 20 and FIG. 39). In the case of receptacles 8*b* of the second type, the opening 15 is provided laterally in a side wall 43 of the receptacle 8*b*. In the case of receptacles 8*b* of the second type, the detector 11 has a touch element 13 in the form of a lever 13*b*, which penetrates through the opening 15 in the tool carrier 7, the opening 15 being arranged laterally of the receptacle 8*b*. Such an embodiment of a detector 11 with a touch switch 12 and a spring-loaded laterally arranged touch element 13 is shown in FIG. 12. Such a touch button 12 has a touch element 13 in the form of an articulated lever 13*b* or spring leg. The touch element 13 in the arm of the lever 13*b* interacts with a spring-loaded pin 23 of the touch switch 12. For such a detector 11 or a touch element 13*b* projecting laterally into the receptacle 8*b*, the opening 15 is designed as an aperture which penetrates the side wall 43 of the tool carrier 7 laterally of the receptacle 8*b*.

Figure 13:
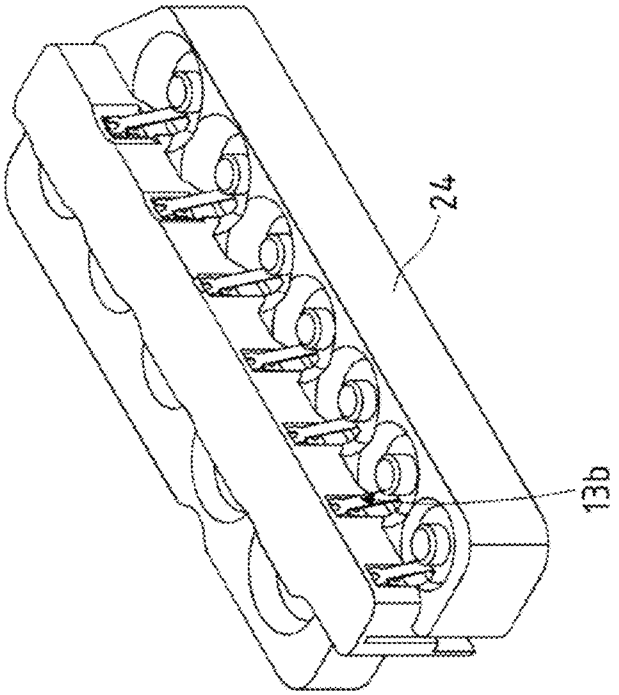
FIG. 13 is a perspective view of a support body with several touch switches arranged in series in accordance with at least one embodiment.
Figure 14:
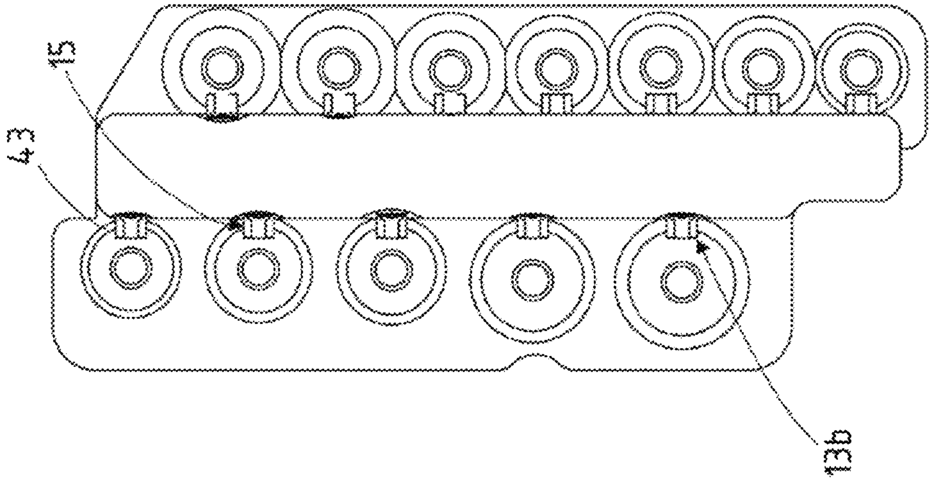
FIG. 14 is the illustration as shown in FIG. 13 in plan view in accordance with at least one embodiment.
Figure 15:
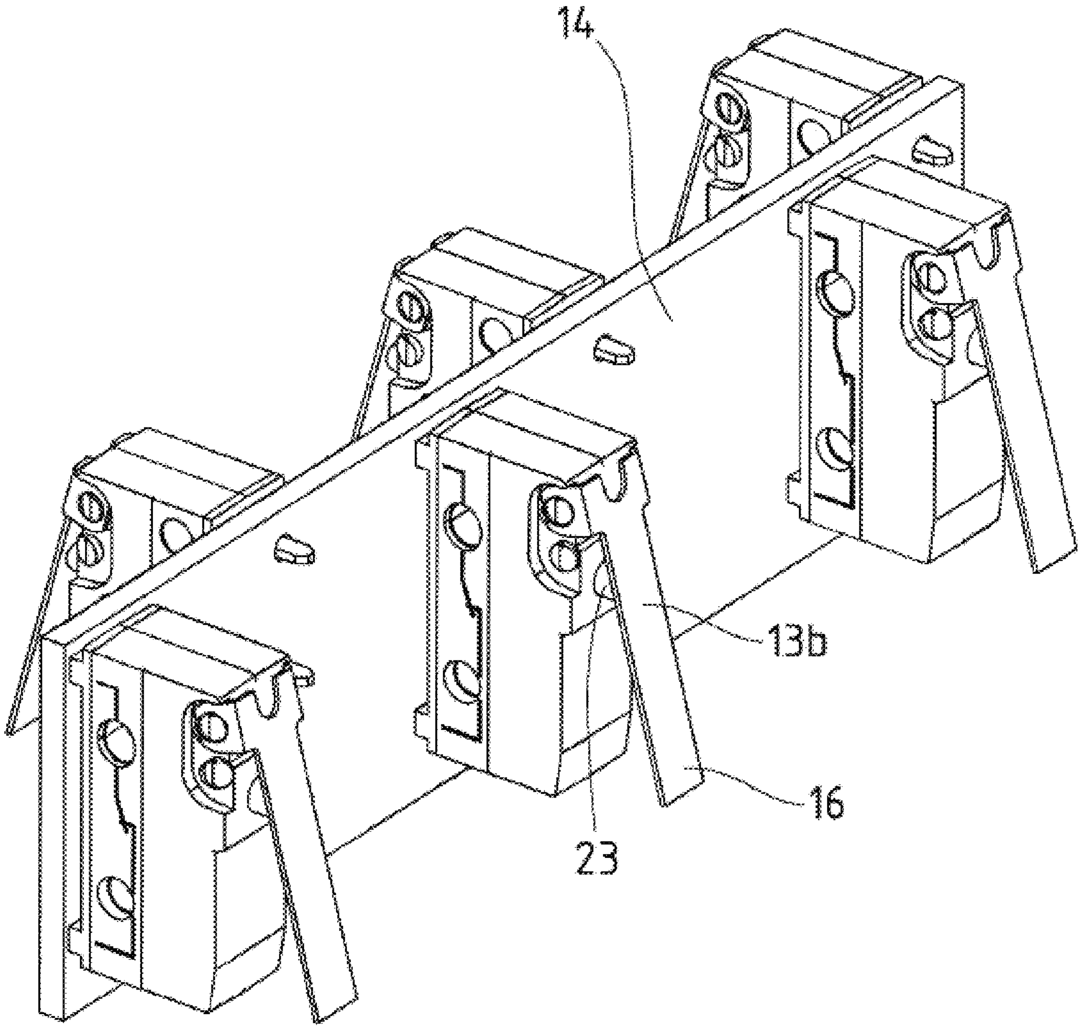
FIG. 15 shows several touch switches arranged in a row on a circuit board in a perspective view in accordance with at least one embodiment.
Figure 16:
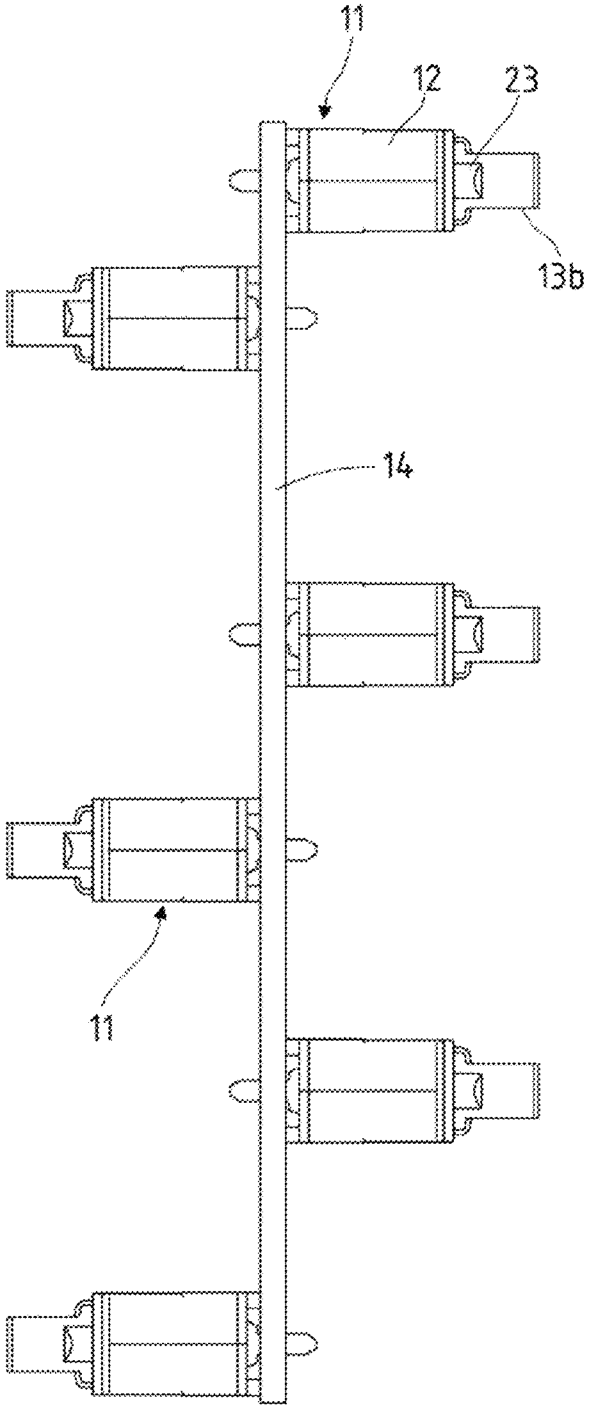
FIG. 16 is the illustration as shown in FIG. 15 in a plan view in accordance with at least one embodiment.

Several touch switches 12 as shown in FIG. 12 are also able to be seen in FIG. 13 to FIG. 16. FIG. 13 and FIG. 14 show several touch switches 12 arranged in a row which are arranged in a support body 24 or are accommodated in the support body 24. In FIG. 13 and FIG. 14 touch switches 12 with touch elements 13 in the form of tappets 13*a* as shown and described with reference to FIG. 7 to FIG. 11 are seen. The touch switches 12 are assigned to a circuit board 14 and placed in the support body 24. Using the support body 24, the touch switches 12 are placed in the drawer 6 and the tool carrier 7 is placed on top. The components are arranged in such a way that the touch switches 12 with the touch elements 13 project into the receptacles 8, 8*a*, 8*b*.

Figure 17:
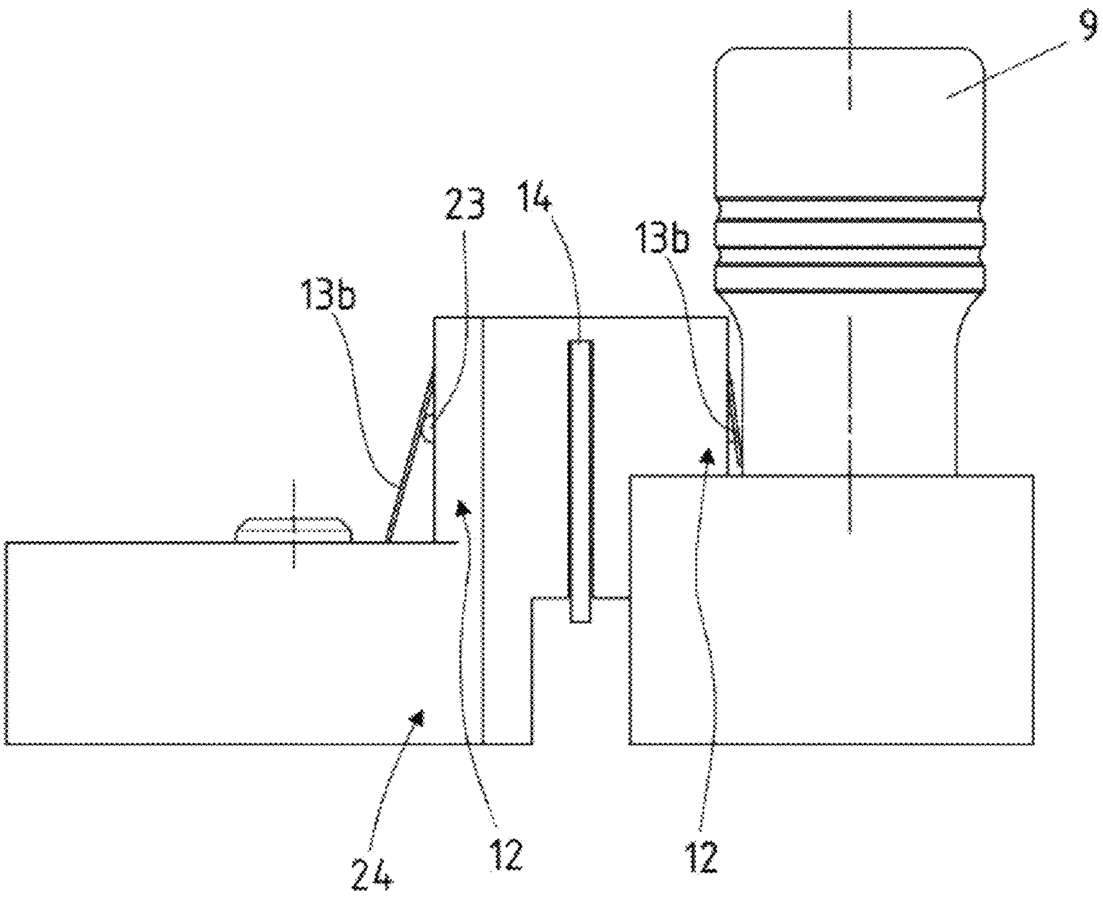
FIG. 17 is a schematic front view of a support body with inserted tool in accordance with at least one embodiment.

Such a situation is able to be seen schematically again in FIG. 17. There, touch switches 12 with touch elements 13 in the form of levers 13*b* are provided.

This is able to be seen in the illustration of FIG. 17 in the left image plane. The right image plane of FIG. 17 shows a tool 9 inserted into a receptacle 8*b*. The tool 9 activates the touch elements 13 and the touch switches 12 arranged there. In the right half of FIG. 17, the touch element 13 in form of a lever 13*b* is able to be seen, which projects into the receptacle 8*b*, is pressed in. The touch element 13 of the touch switch 12 is thereby actuated and the detector 11 is activated. This generates a signal and is processed accordingly. The system detects that the slot is occupied and tool 9 is present. When removed, the touch element 13, 13*b* on the touch button 12 moves back and the signal becomes negative, which means that a tool 9 is missing.

The data processing unit of the tool identification and management system of the workshop trolley 1 receives the signals from the detectors 11 and detects the presence or absence of a tool 9 in a receptacle 8 or 8*a*, 8*b*. The data processing unit is also able to be used to capture tool usage data as well as tool status data and/or tool user data. Tool inventory as well as information on maintenance and condition of the tools and the users are captured and archived and are able to be shown on a display that communicates wirelessly or wired with the data processing unit.

The workshop trolley 1 is further equipped with a locking system by means of which the drawers 6 in the housing 3 is able to be centrally locked. Part of the data processing unit is functional electronics that controls at least one actuator. The latter is used to operate a locking bar of the locking system. Furthermore, the functional electronics are able to have a wireless communication module, for example, Bluetooth or Wi-Fi.

On the narrow side of the workshop trolley 1 adjacent to the handle 5, a functional area 19 is provided, protected by the handle 5. An interface 20 for an identification element, for example, an RFID sensor, is arranged there, by means of which the locking system of the workshop trolley 1 is able to be opened and closed. Furthermore, an emergency release with a cylinder lock 21 is arranged there, via which the locking system is able to be unlocked manually and mechanically as needed.

The workshop trolley 1 has an electrical power supply unit 48, which includes a rechargeable battery 22, which is arranged on a housing wall of the workshop trolley 1 so as to be replaceable.

Figure 3:
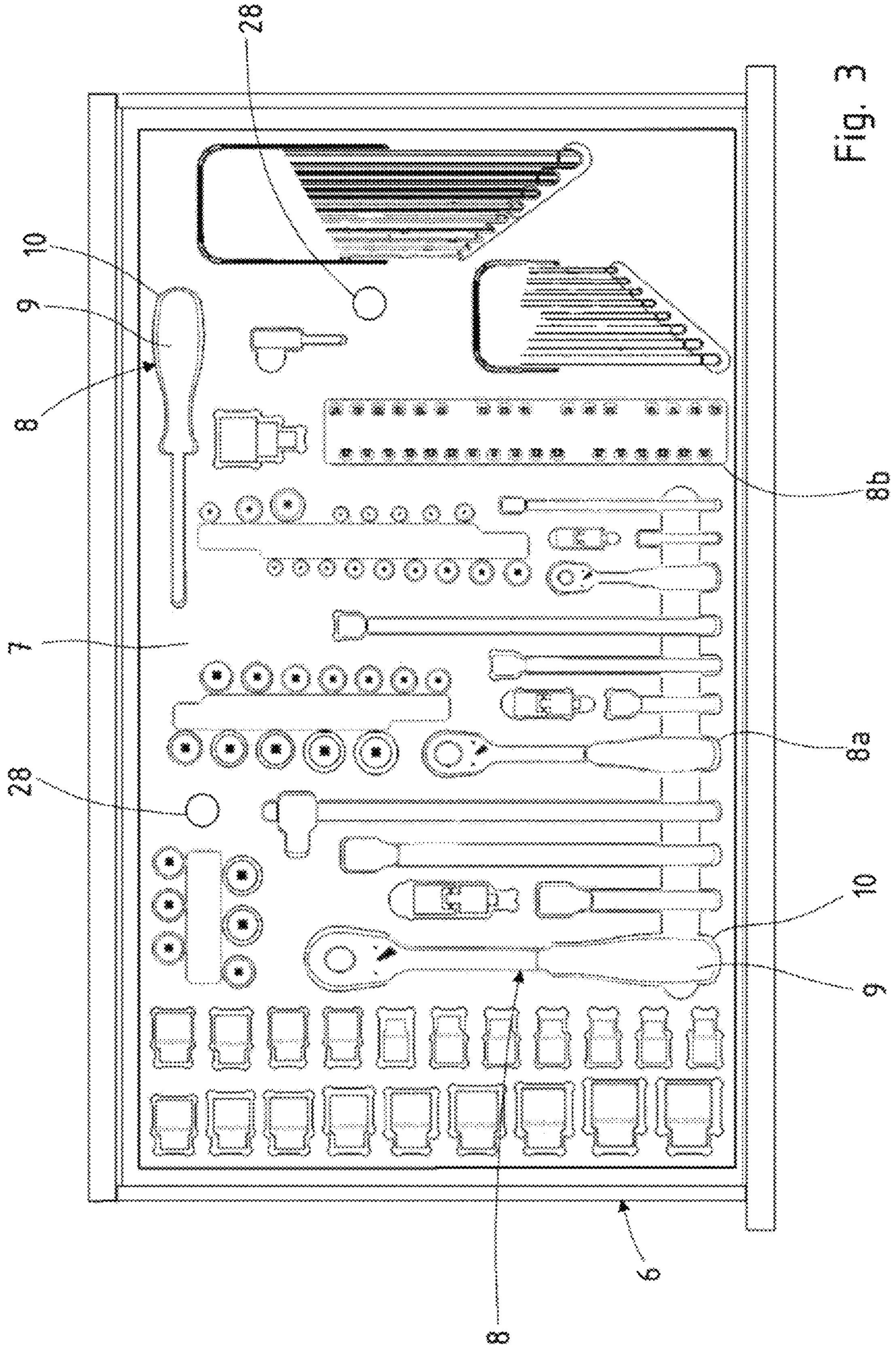
FIG. 3 is a look into the drawer equipped with tools in accordance with at least one embodiment.
Figure 4:
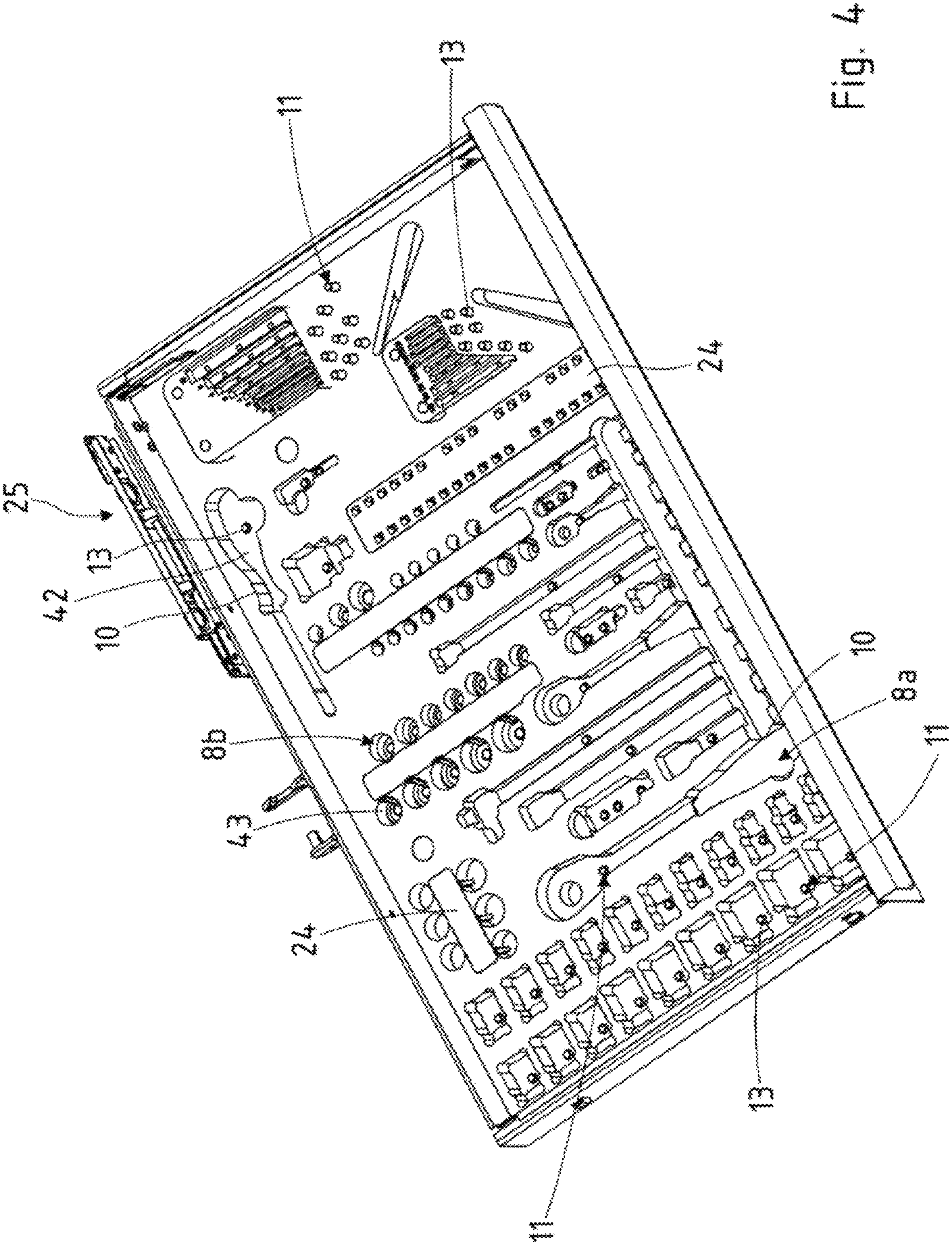
FIG. 4 shows the drawer without tools with a view of the tool receptacles in accordance with at least one embodiment.
Figure 5:
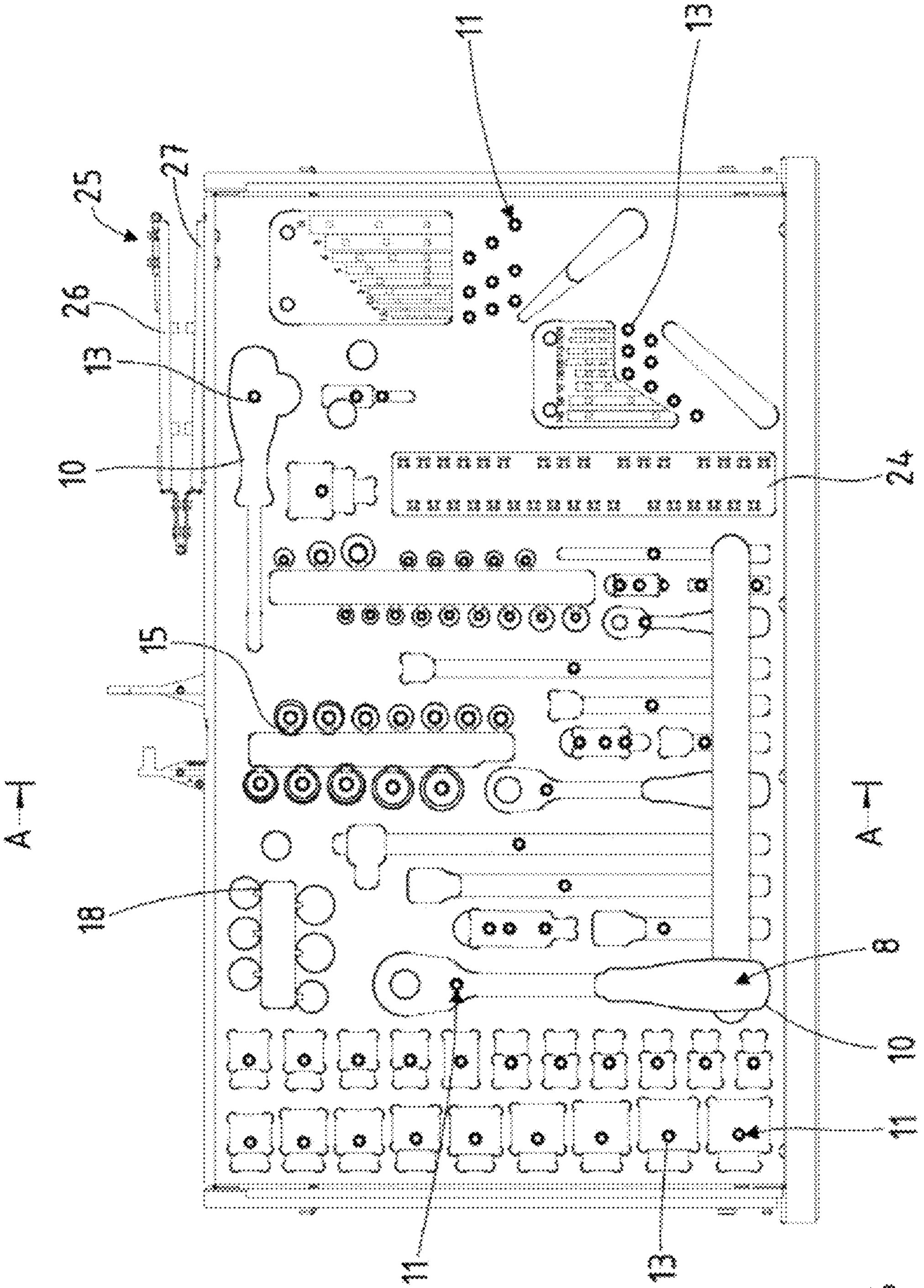
FIG. 5 shows the drawer as shown in FIG. 4 in plan view in accordance with at least one embodiment.
Figure 6:
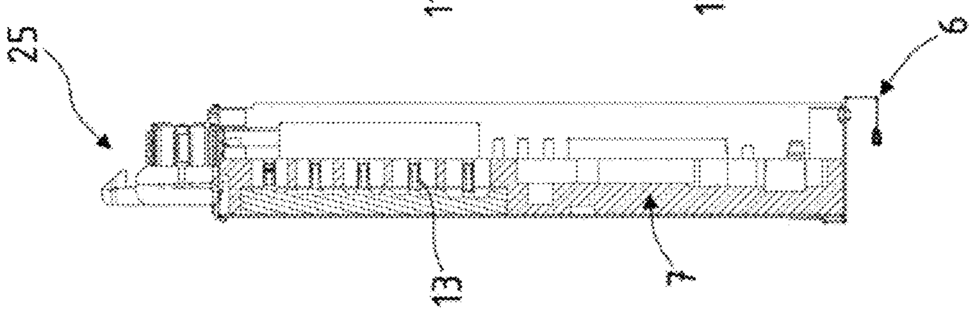
FIG. 6 shows a section through the illustration in FIG. 5 along line A-A in accordance with at least one embodiment.
Figure 10:
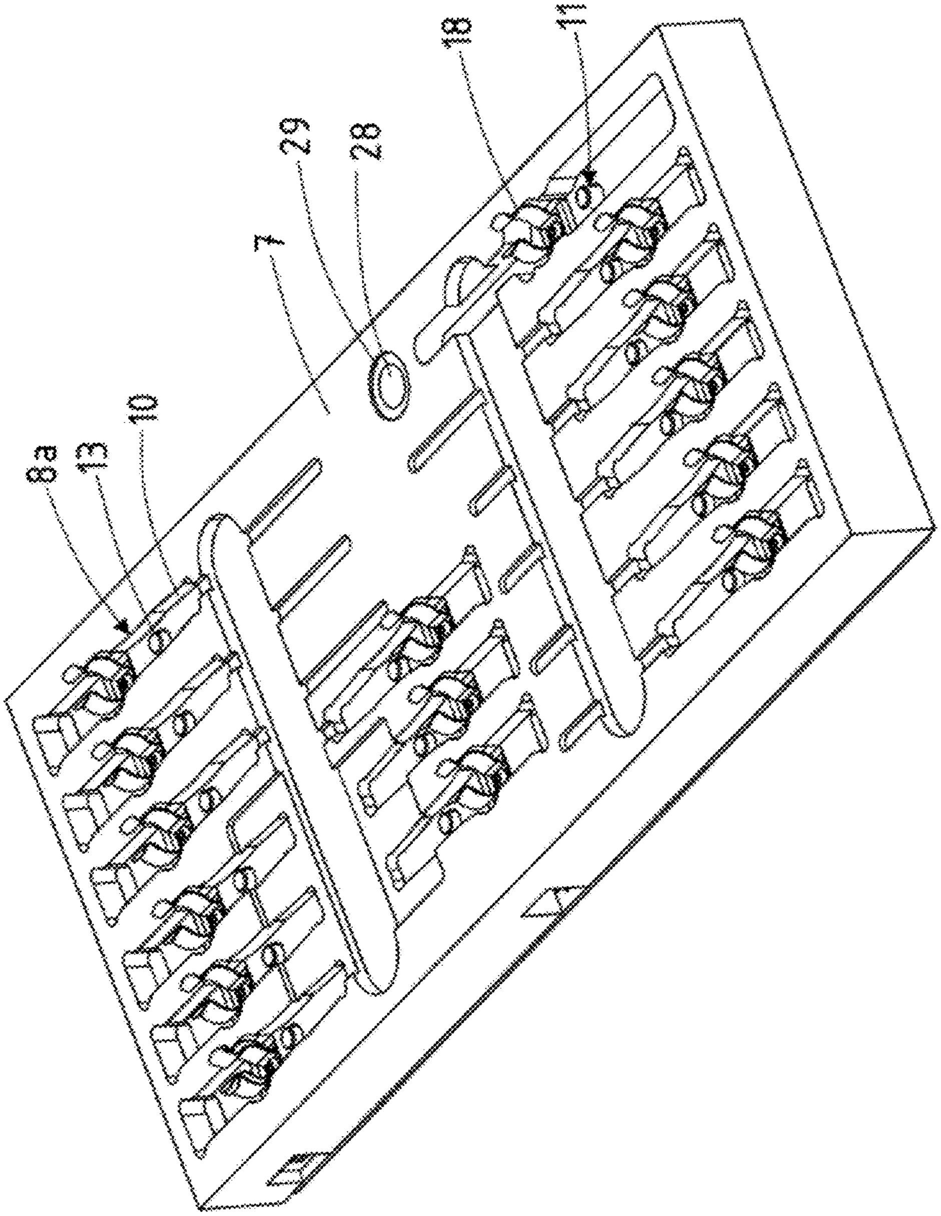
FIG. 10 is a perspective view of a tool carrier in accordance with at least one embodiment.
Figure 11:
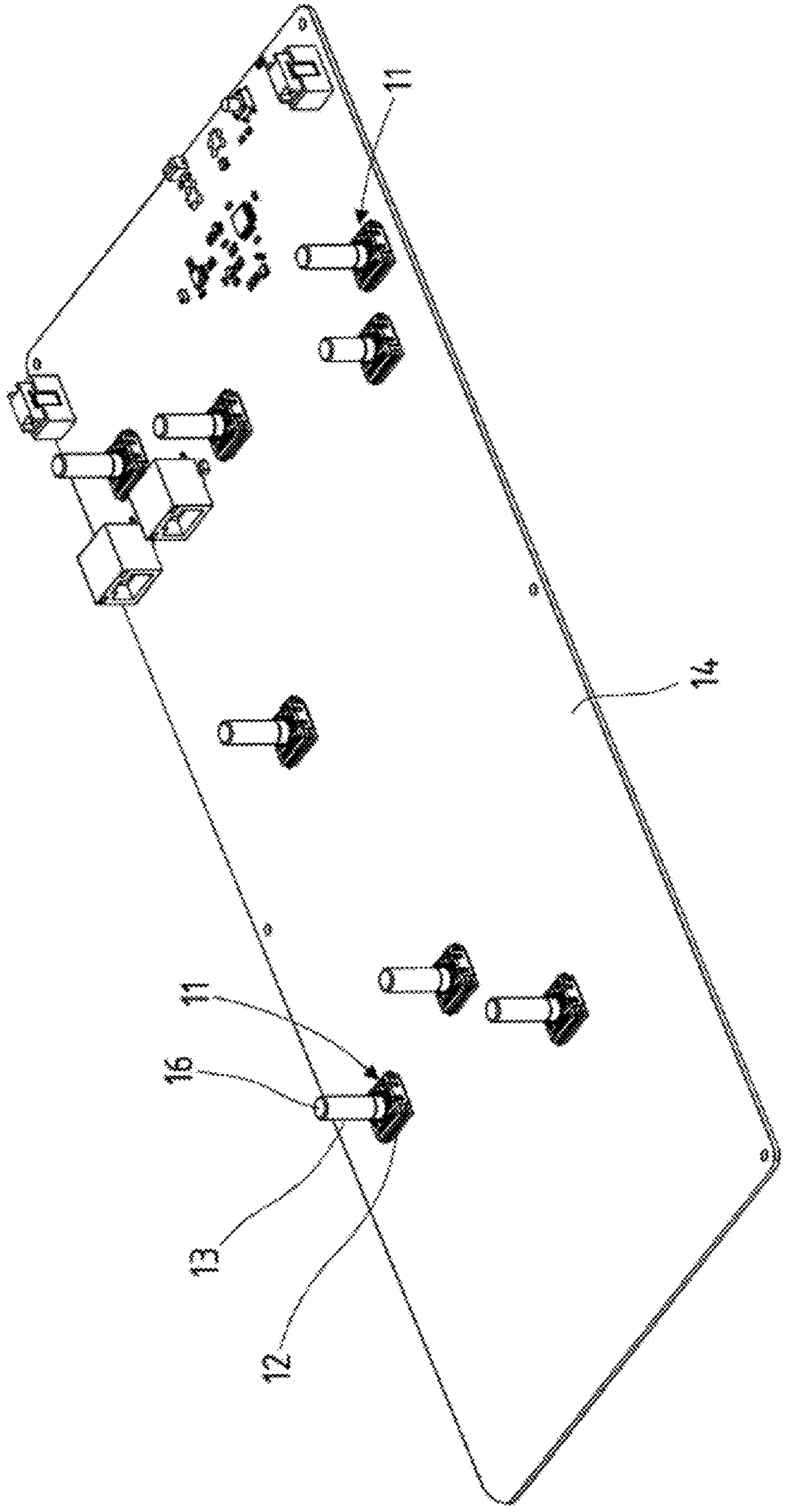
FIG. 11 is a perspective view of a circuit board equipped with touch switches and connection components in accordance with at least one embodiment.
Figure 23:
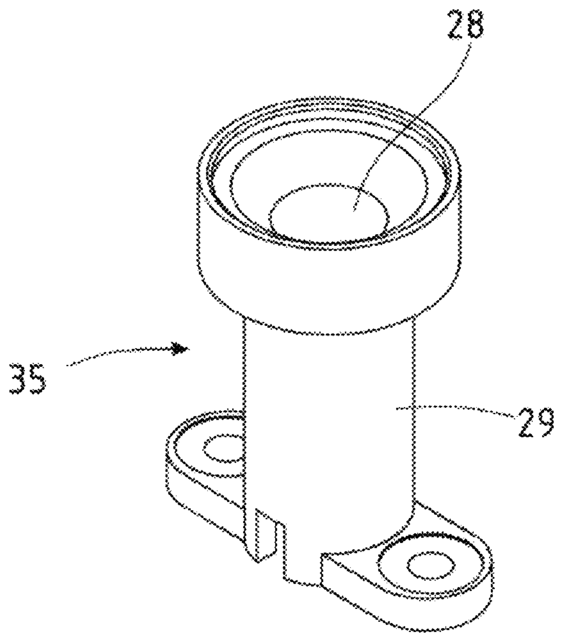
FIG. 23 shows a holding body for an optical signal element in one perspective in accordance with at least one embodiment.

The workshop trolley 1 is equipped with one or more signal elements 28 in the form of light-emitting diodes. Such an optical signal element 28 is shown in FIG. 2, FIG. 3, and FIG. 10. A holder 29 for a signal element 28, which is able to be mounted on a printed circuit board 14, is shown in FIG. 23. Such a holder 29 with the optical signal element 28 in the form of an LED forms a so-called LED dome.

Figure 27:
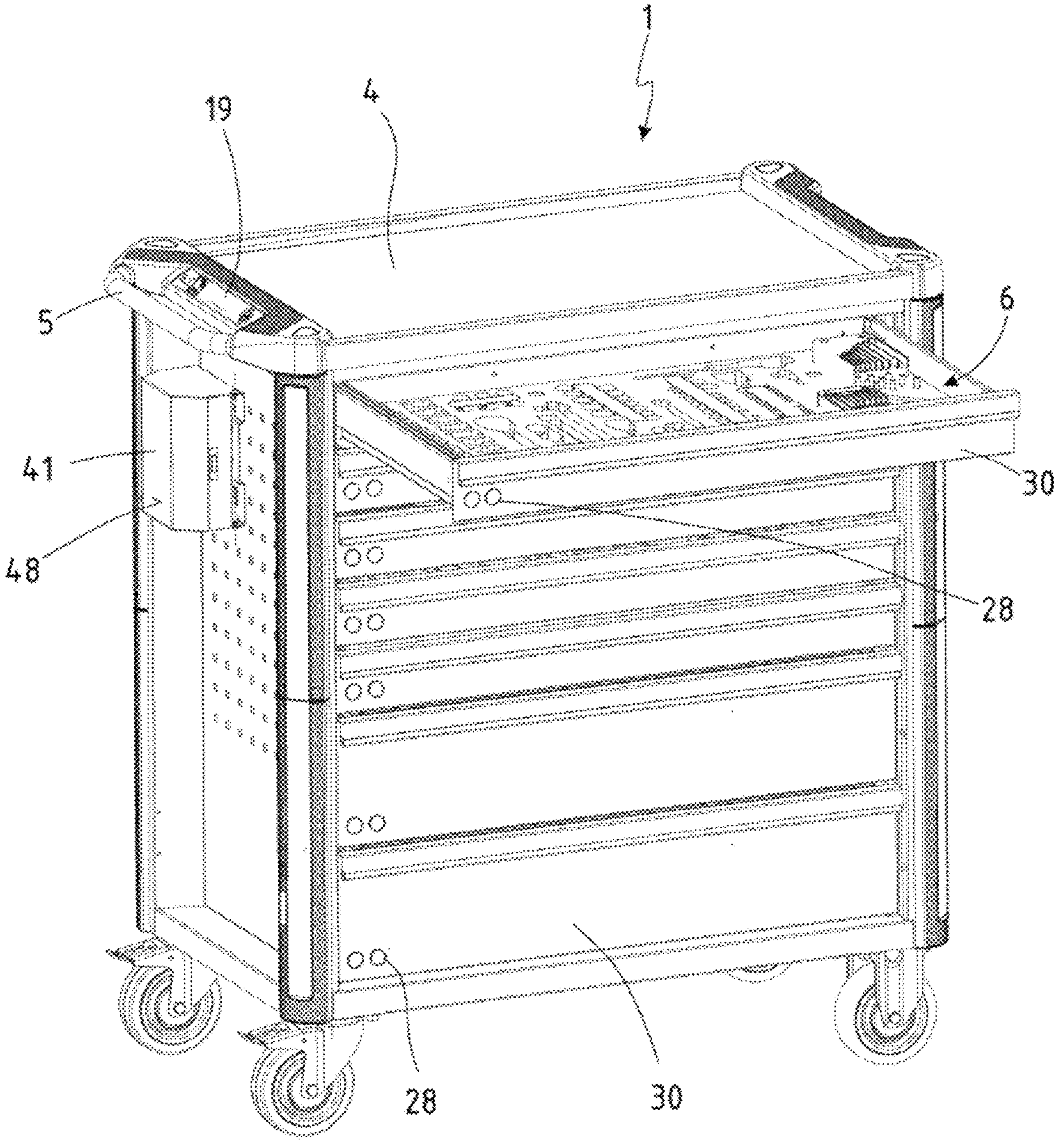
FIG. 27 is a perspective view of a workshop trolley with the upper drawer open in accordance with at least one embodiment.

In the workshop trolley 1 as shown in FIG. 27, additional signal elements 28 are provided on the front sides 30 of the drawers 6.

The signal elements 28 signal the presence or absence of a tool 9 in a drawer or a receptacle 8 in a tool carrier 7.

It is also possible to arrange signal elements 28 in the form of control lamps on a display and in the functional area 19 of a workshop trolley 1.

Figure 18:
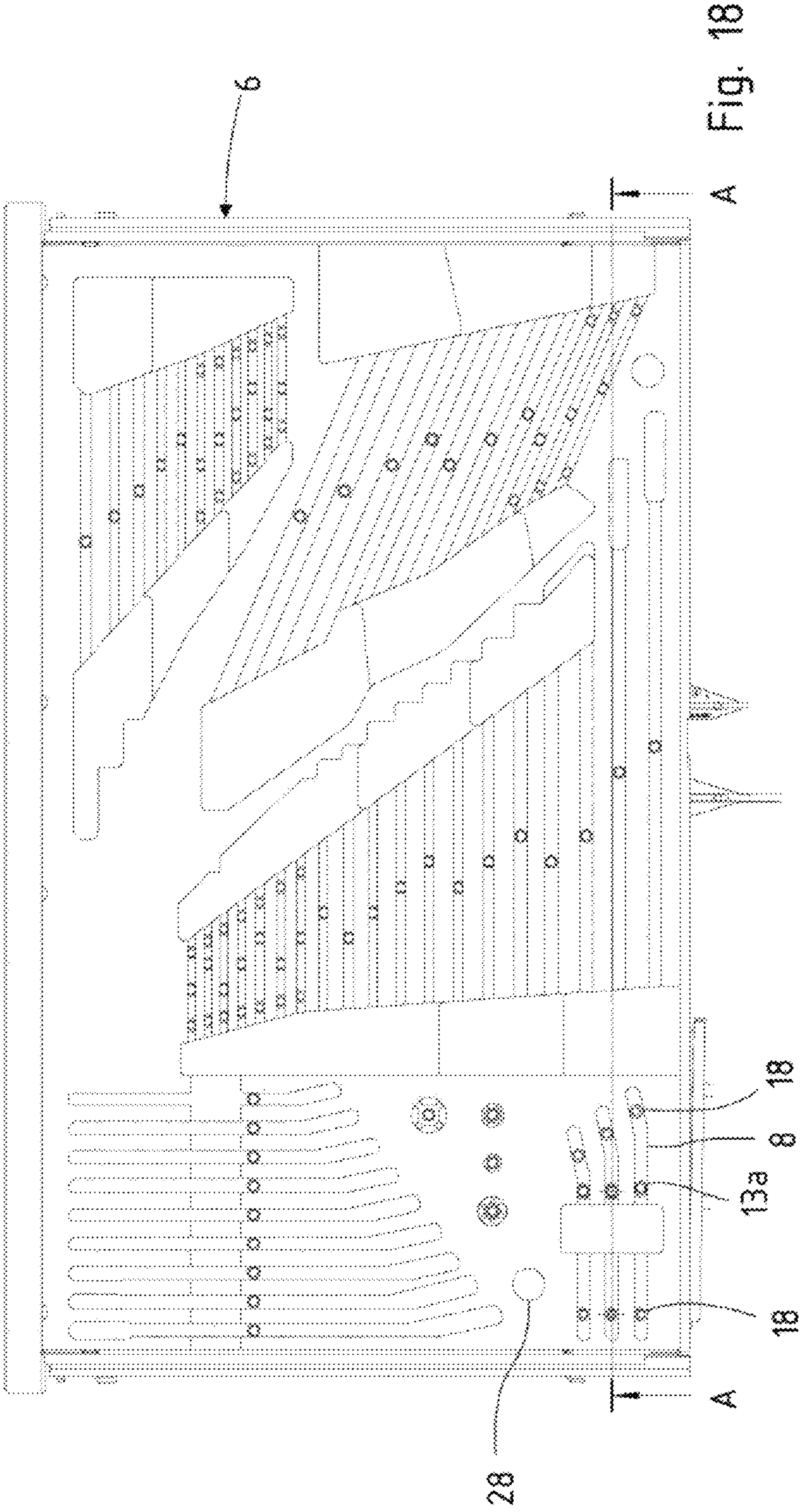
FIG. 18 is another top view of a drawer with the tool carrier without tools in accordance with at least one embodiment.
Figure 19:
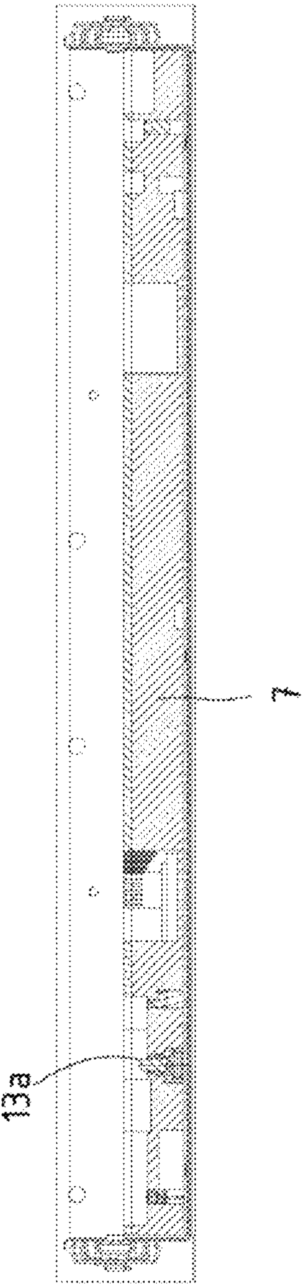
FIG. 19 shows a section through the illustration of FIG. 18 along line A-A in accordance with at least one embodiment.

FIG. 18 and FIG. 19 show another embodiment of a drawer 6 with an integrated tool carrier 7, which is formed by a soft foam insert. In the tool carrier 7, receptacles 8 are provided for different tools 9. A receptacle 8 has a recess 10 adapted to the shape of a specific tool 9 with integrated detectors 11 via which the presence of a tool 9 in the receptacle 8 is captured.

A detector 11 with a touch switch 12 and a touch element 13 is also shown in the illustration in FIG. 19. The touch element 13 is arranged in a housing 31, which functions as a support body for the touch switch 12 and guides the touch element 13, mechanically protects and ensures its mobility and smooth movement.

In various receptacles 8, holder elements 18 are arranged in the form of magnetic holder elements or magnet holders. The magnetic holders act as pressure amplifiers within the receptacles 8. Tools 9 made of ferromagnetic materials are drawn into the receptacle 8 by magnetic force and an associated touch switch 12 is actuated by contact with the tools 9.

Figure 25:
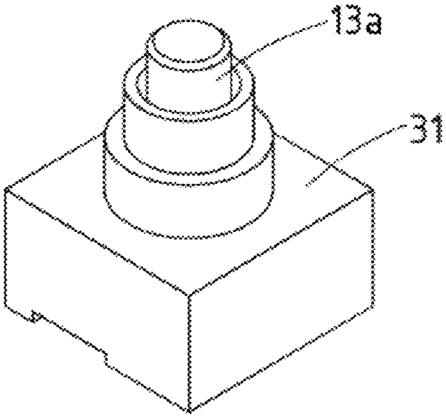
FIG. 25 is an embodiment of a touch switch in perspective in accordance with at least one embodiment.
Figure 26:
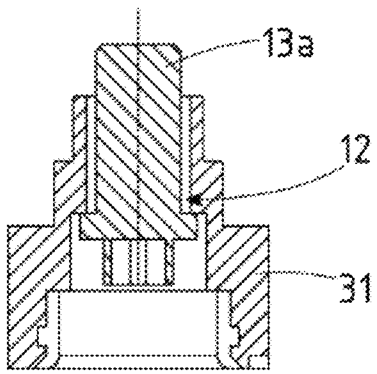
FIG. 26 the touch switch as shown in FIG. 25 in a sectional view in accordance with at least one embodiment.

The illustrations in FIG. 25 and FIG. 26 show a touch switch 12 with a touch element 13 arranged in a housing 31 acting as a support body.

Figure 29:
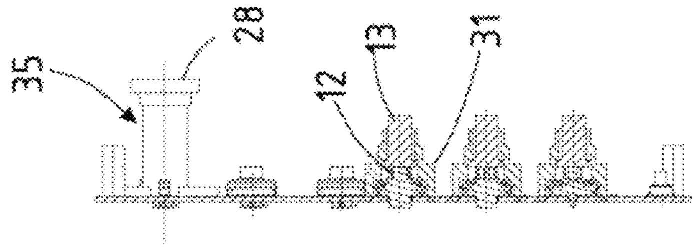
FIG. 29 is a top view of a circuit board with mounted touch elements in accordance with at least one embodiment.
Figure 28:
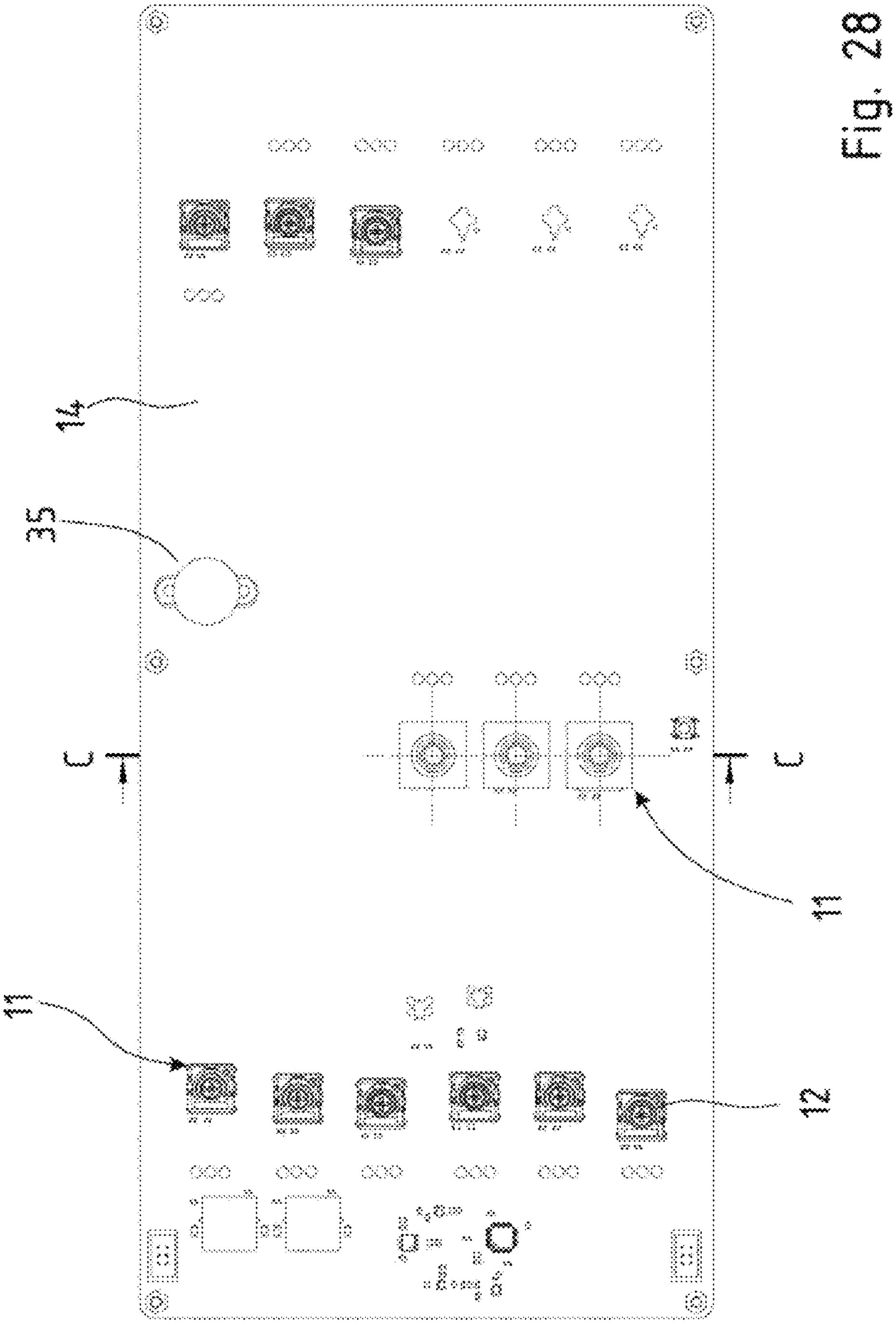
FIG. 28 is a top view of a circuit board with mounted touch elements in accordance with at least one embodiment.

The illustrations in FIG. 28 and FIG. 29 also show a printed circuit board 14 equipped with touch switches 12 and touch elements 13 integrated in a housing 31. There, LED dome 35 with a signal element 28 held in a holder 29 is also able to be seen.

Figure 24:
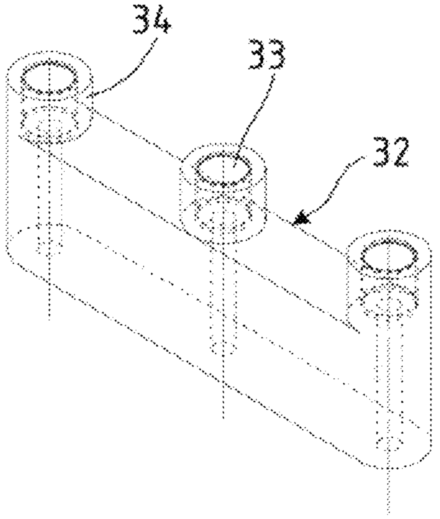
FIG. 24 is a perspective view of a holder component with integrated holder elements in accordance with at least one embodiment.

A special embodiment of a holder element 18 with magnetic holder elements is shown in the illustration in FIG. 24. There, a total of three magnets 33 is arranged in series in the magnet receptacles 34 in a holder body 32.

Figure 30:
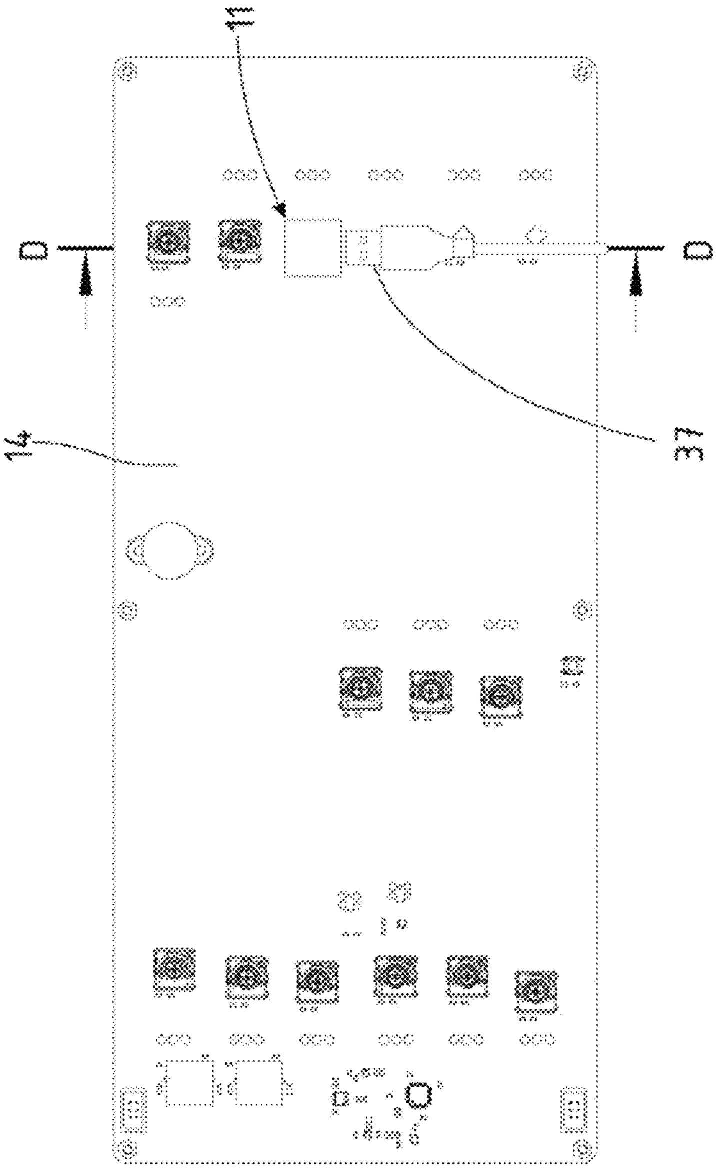
FIG. 30 is a plan view of another embodiment of a circuit board equipped with touch switches showing the end of a USB cable in accordance with at least one embodiment.

A special embodiment of a detector 11 is explained with reference to FIG. 30 to FIG. 32. The detector 11 has an electrical connector interface 36 for receiving an electrical plug element 37. The plug element 37 is the USB plug of a USB cable.

To facilitate the actuation of the touch element 13, the touch element 13 has an angled front surface 38. When the USB plug is inserted, the USB plug comes into contact with the front surface 38 and presses the spring-loaded button element 13 of the touch switch 12 downwards and actuates it.

Figure 31:
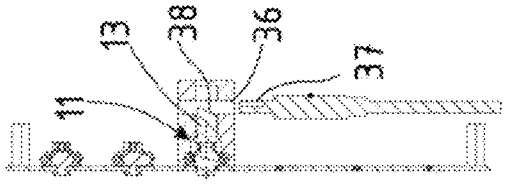
FIG. 31 shows a section through the circuit board as shown in FIG. 30 along the line D-D with the USB connector not connected in accordance with at least one embodiment.

FIG. 31 shows the arrangement before inserting the USB plug into the connector interface 36 of the touch switch 12.

Figure 32:
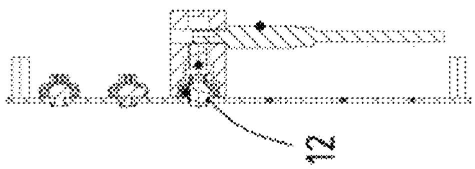
FIG. 32 shows a section through the circuit board according to FIG. 30 along section D-D showing a coupled USB plug in accordance with at least one embodiment.

FIG. 32 shows the arrangement in the connector interface 36 with the plug element 37 inserted.

Figure 22:
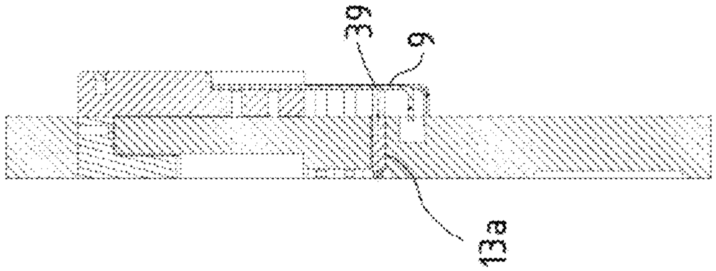
FIG. 22 shows a section through the illustration of FIG. 21 along line B-B in accordance with at least one embodiment.
Figure 21:
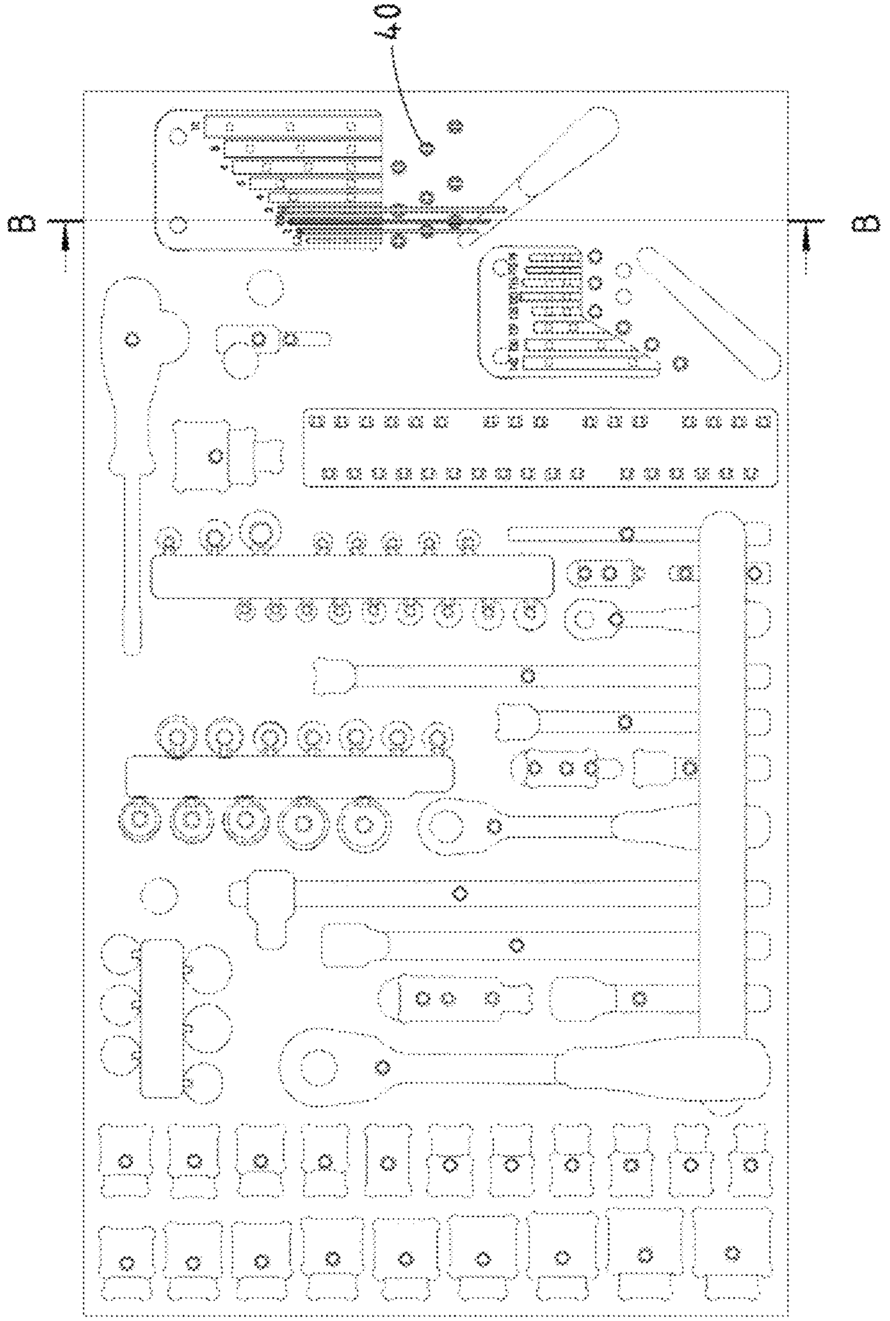
FIG. 21 is a plan view of the tool carrier as shown in FIG. 20 in accordance with at least one embodiment.

The illustrations in FIG. 20 to FIG. 22 illustrate that the touch elements 13 have front sides 39 with a semicircular surface contour 40. The surface contour 40 is matched to the outer contour of a tool 9, in the illustrated case of an angled screwdriver. The surface contour 40, which is adapted to the tools 9, makes easier to feel for the position of the tools 9.

In the illustration of the tool trolley 1 as shown in FIG. 27, a housing 41 which covers and protects a battery is also able to be seen.

Figure 33:
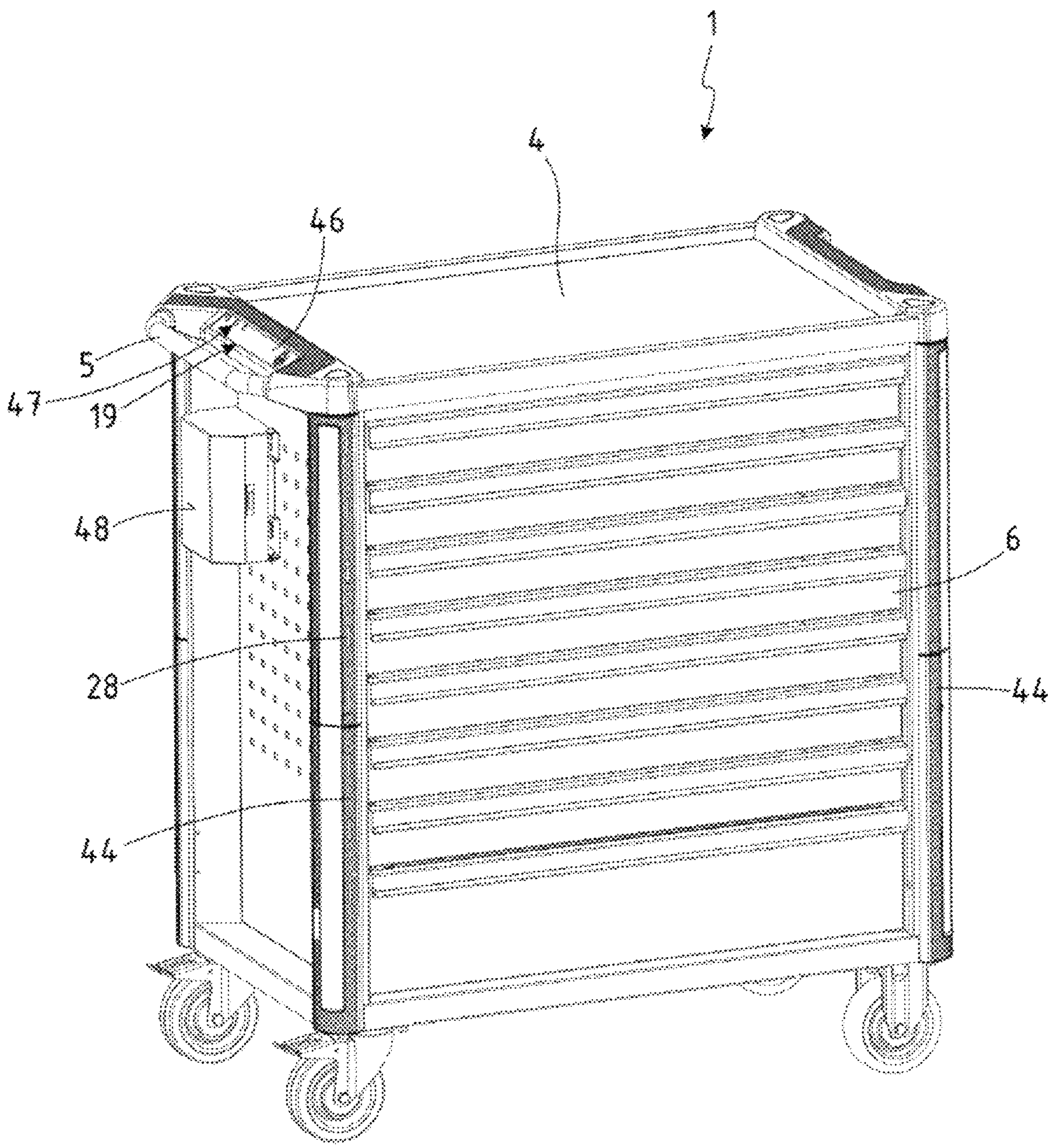
FIG. 33 shows another embodiment of a workshop trolley in a perspective view in accordance with at least one embodiment.
Figure 34:
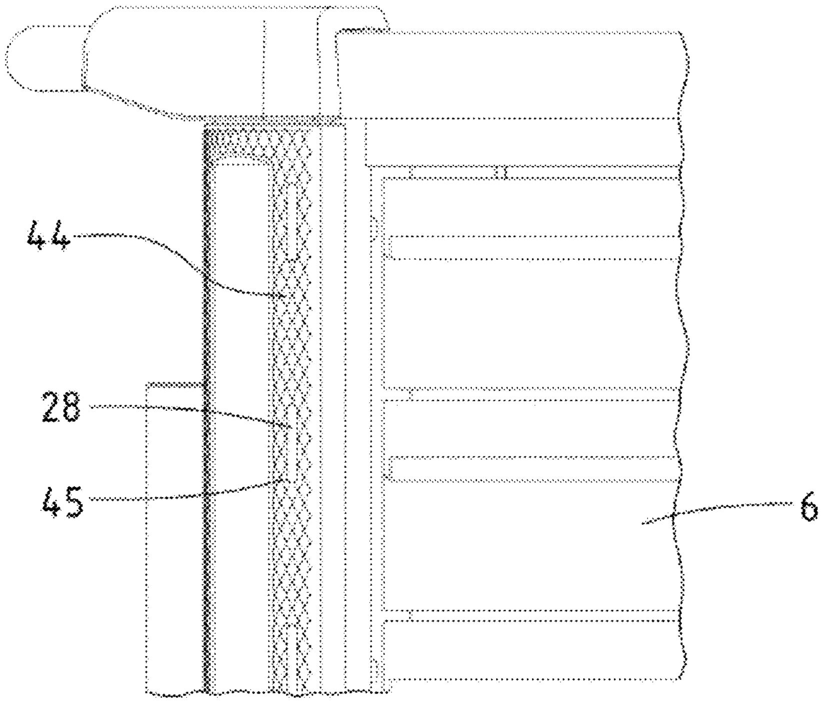
FIG. 34 shows a section of the workshop trolley as shown in FIG. 33 in a front view in accordance with at least one embodiment.
Figure 35:
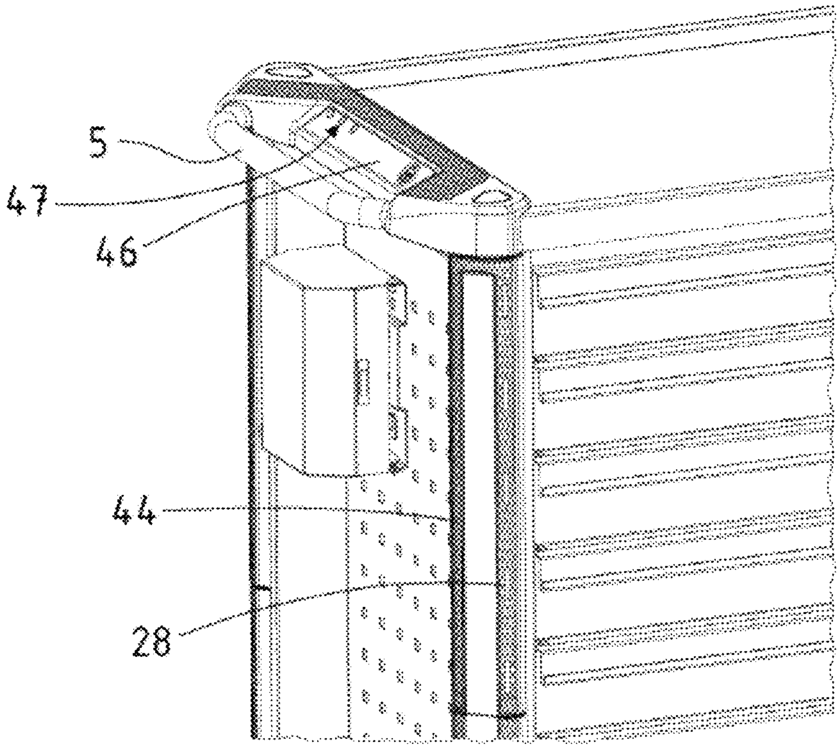
FIG. 35 shows a section of the workshop trolley as shown in FIG. 33 in a perspective view in accordance with at least one embodiment.

FIG. 33 shows a perspective view of a workshop trolley 1 in the closed state. FIG. 34 and FIG. 35 show sections of the workshop trolley 1 as shown in FIG. 33.

The workshop trolley 1 is constructed as previously described. Reference is made to the above description.

In the workshop trolley 1 according to the illustration in FIG. 33 and FIG. 34, a signal element 28 is arranged in an edge protection element 44 provided on the housing 3. The housing 3 of the workshop trolley 1 is equipped with an edge protection element 44 on all four vertical side edges of the housing 3. The edge protection elements 44 act as impact and ram protection and are made of an elastic plastic material. The edge protection elements 44 primarily have a protective function. In the workshop trolley 1, signal elements 28 are arranged in the edge protection element 44 on the left in the image plane on the front side of the trolley or housing. Recesses 45 are provided in the edge protection element 44 to receive the signal elements 28. The upper end of the recesses 45 is at the same height as the upper edges of a drawer 6, namely at the same height as the drawer handles.

The integration of the signal elements 28 into the lateral edge protection element 44 on the front side of the housing is functionally advantageous because the signal elements 28 are clearly visible adjacent to the drawer level and are also protected by the edge protection element 44.

In the tool supply device in the form of the workshop trolley 1, a display 46 is arranged laterally in the area of the cover plate 4, protected by the handle 5. Furthermore, a signal unit 47 is provided, which is designed and intended to signal the closed state of the workshop trolley 1 and the battery charge state of an electrical energy supply unit 48, for example, of a rechargeable battery, and/or the completeness of the tool inventory in the workshop trolley 1.

Figure 36:
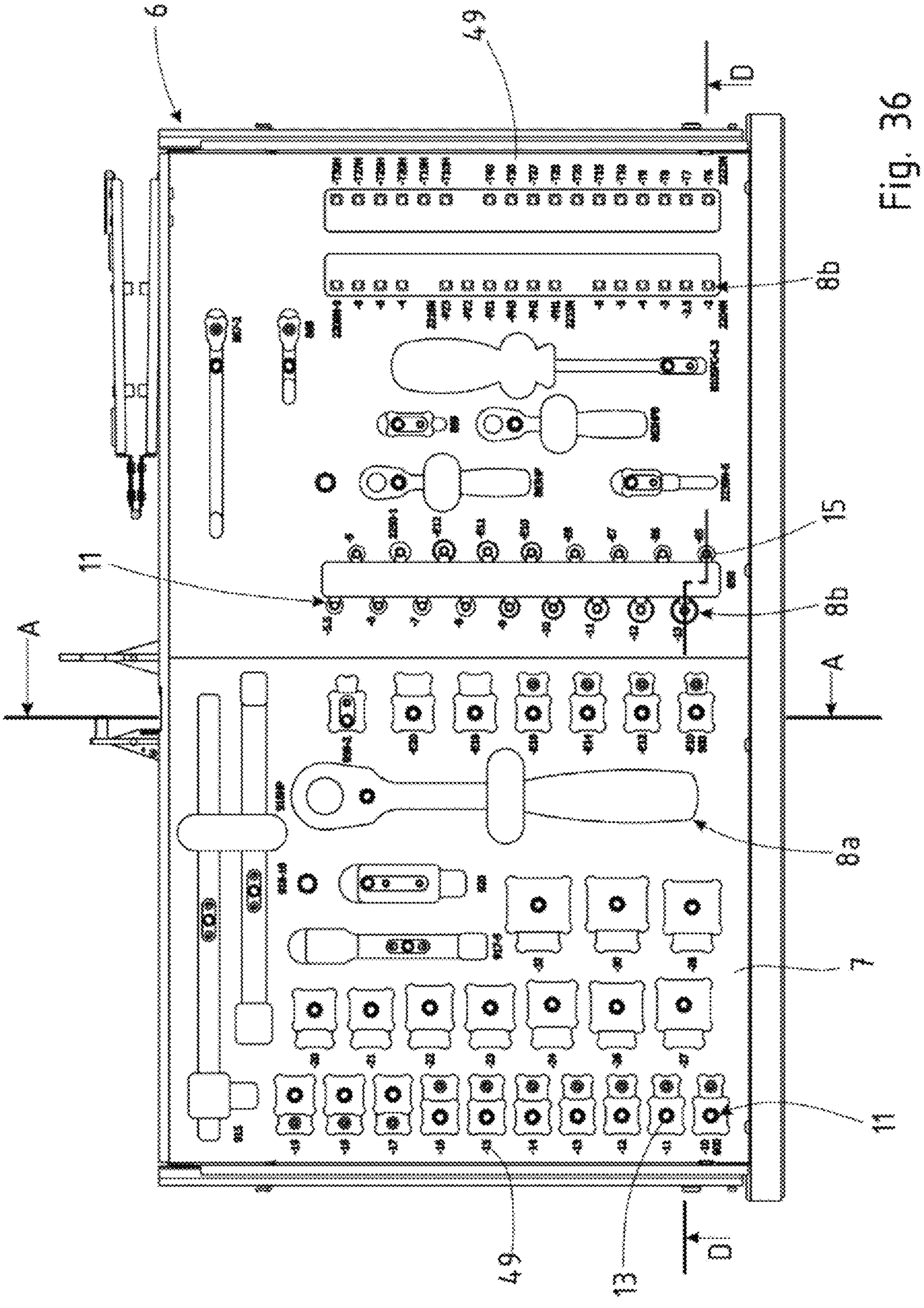
FIG. 36 is a top view of a drawer without tools in accordance with at least one embodiment.
Figure 37:
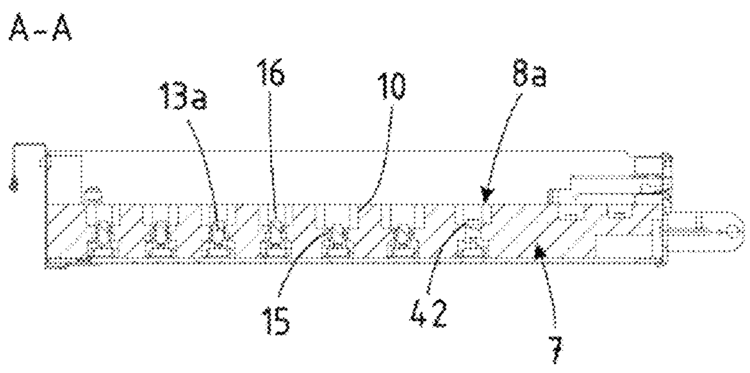
FIG. 37 shows a section through the illustration of FIG. 36 along the line A-A in accordance with at least one embodiment.
Figure 38:
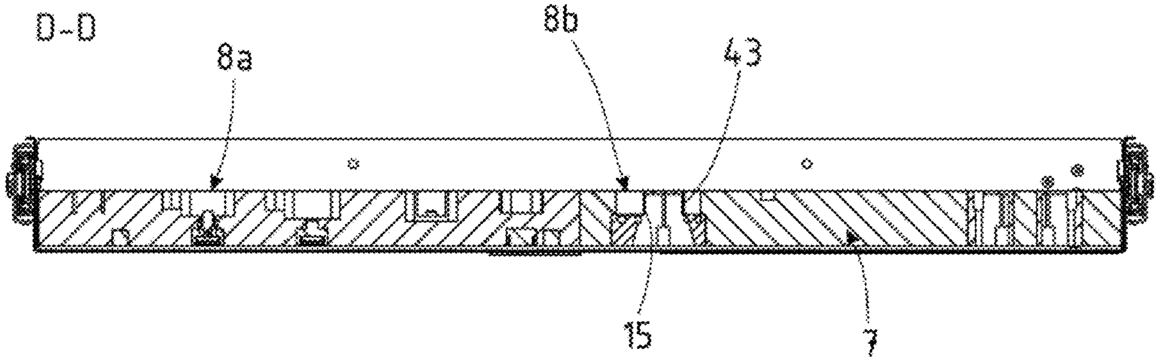
FIG. 38 a section through the illustration of FIG. 36 along the line D-D in accordance with at least one embodiment.

In FIG. 36 to FIG. 38, a drawer 6 with integrated tool carrier 7 is again shown in a plan view and in sectional views corresponding to those A-A and D-D. The design corresponds to the type previously explained. Reference is made to the corresponding versions and component names. FIG. 37 shows a tool carrier 7, formed from a soft foam insert, with receptacles 8*a* of the first type. Recesses 10 adapted to the shape of a specific tool 9 are formed in the tool carrier 7. For the receptacles 8*a* of the first type, the opening 15 is an aperture penetrating the wall of the tool carrier 7 below a receptacle 8*a*. The touch element 13 with its tappet 13*a* is guided through the bottom 42 of the receptacle 8*a* and projects with its active surface 16 into the receptacle 8*a*.

In the sectional view of FIG. 38, receptacles 8*a* of the first type and receptacles 8*b* of the second type is able to be seen.

In the top view of the drawer 6 and the tool carrier 7 received therein according to FIG. 36, the individual receptacles 8, 8*a*, 8*b* are provided with individual identification features 49 in the form of a label. This is also illustrated in FIG. 39.

FIG. 39 again shows a tool carrier 7 with receptacles 8*a* of the first type and receptacles 8*b* of the second type.

Figure 40:
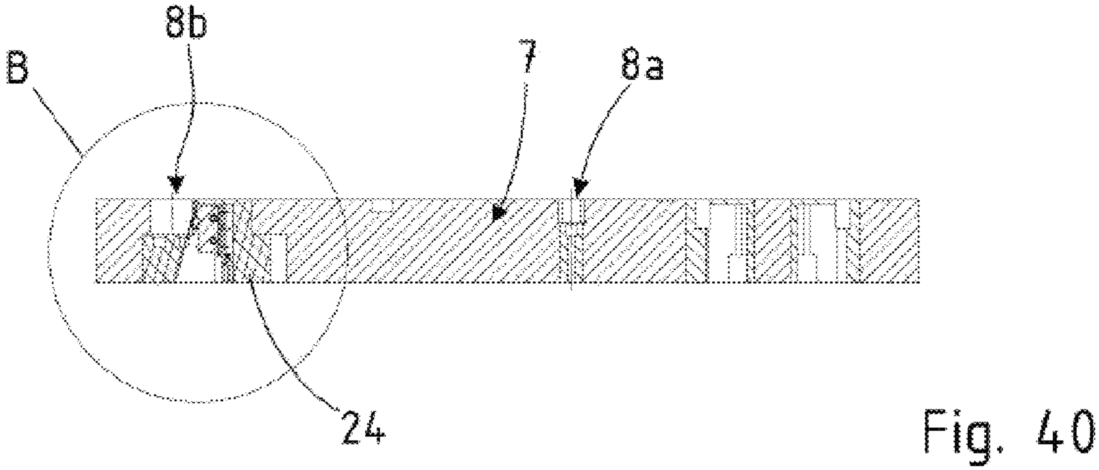
FIG. 40 shows a section through the tool carrier of FIG. 39 along the line A-A in accordance with at least one embodiment.
Figure 41:
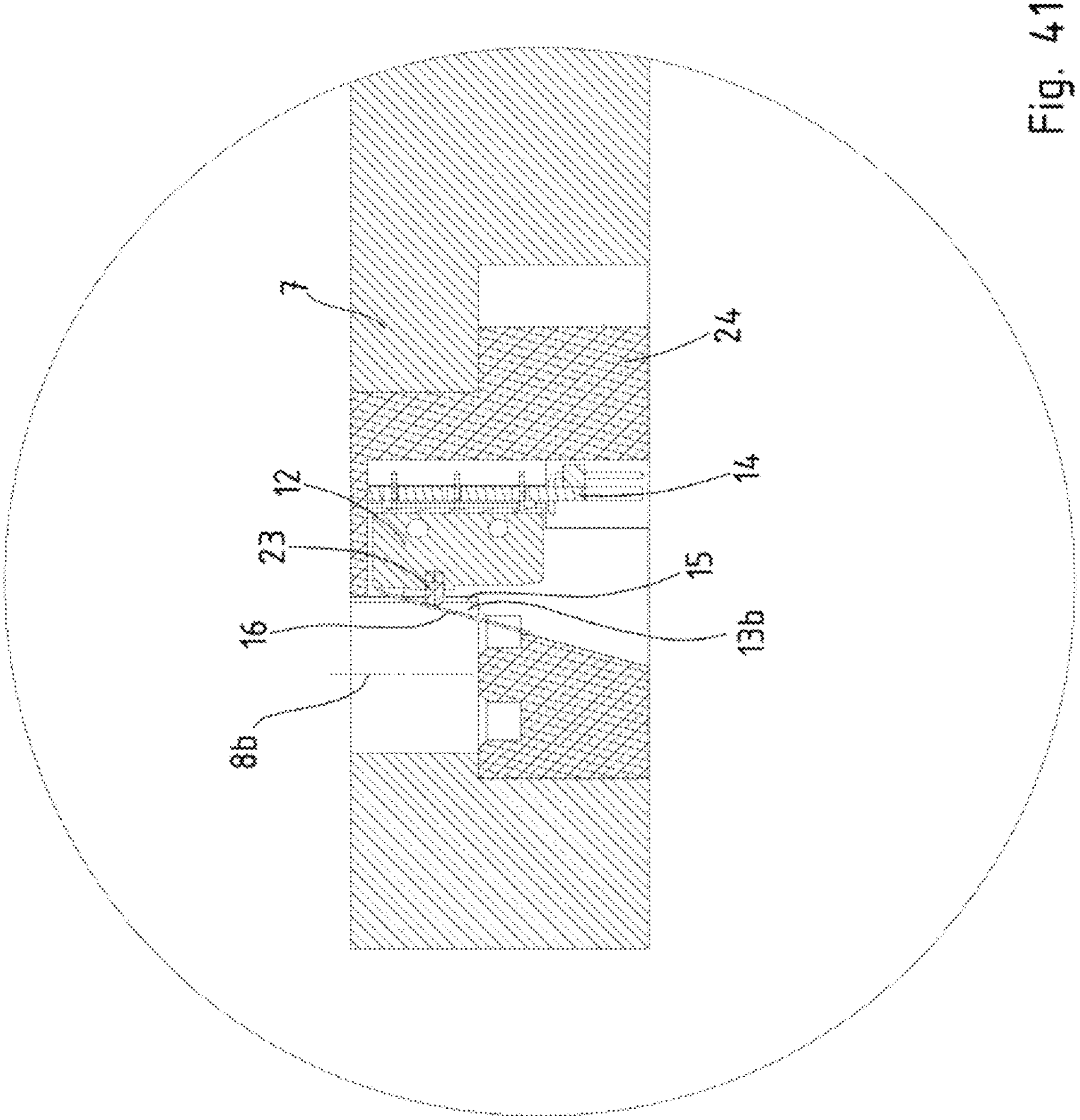
FIG. 41 the section B from FIG. 40 in an enlarged view in accordance with at least one embodiment.

FIG. 40 shows a section through the illustration of FIG. 39 along the line A-A. Using the enlarged illustration in FIG. 41, a receptacle 8*b* of the second type is explained again.

In the case of the second type of recesses 8*b*, the opening 15 is arranged laterally of the recess 8*b* in its side wall 43. In the receptacles of the second type 8*b*, a detector 11 has a touch switch 12 with a spring-loaded lateral touch element 13 in the form of a lever 13*b*. The lever 13*b* penetrates through the opening 15 and projects laterally into the recess 8*b*.

The touch switch 12 is arranged on a vertically oriented circuit board 14. This is held by a support body 24. The support body 24 is part of the tool carrier 7 or complements the tool carrier 7. The touch element 13 in the form of the spring-loaded lever 13*b* projects through the lateral opening 15. The lever 13*b* projects laterally with its active surface 16 opposite the opening 15 and projects into the recess 8*b*. The lever 13 is articulated on the touch switch 12 and is supported on the touch switch via the spring-loaded pin 23. By inserting a tool 9 into the receptacle 8*b*, the lever 13*b* of the touch element 13 is pressed sideways towards the touch switch 12. The movement of the lever 13*b* is transmitted to the touch switch 12 via the pin 23. A signal is generated and the presence of the tool 9 in the second type of recess 8*b* is detected.

The invention claimed is:

1. A tool supply device, comprising:

a housing and a container arranged in the housing, wherein a tool carrier is provided in the container, the tool carrier having a plurality of receptacles for tools; and a detector assigned to each receptacle of the plurality of receptacles, for detecting the presence of a tool in the receptacle, wherein the detector assigned to each receptacle of the plurality of receptacles has a touch switch with a touch element, wherein the touch element penetrates through an opening in the tool carrier and projects with an active surface into the receptacle, and wherein the touch switch is fastened to a circuit board which is arranged on a bottom of the container below the tool carrier, wherein in at least one receptacle of a first type among the plurality of receptacles, the opening penetrates through a wall of the tool carrier below the receptacle of the first type, and the touch element projects from below through a bottom of the receptacle of the first type, wherein in at least one receptacle of a second type among the plurality of receptacles, the touch element projects laterally into the receptacle of the second type, and wherein in at least one receptacle among the plurality of receptacles, a holder element is arranged which functions as a pressure amplifier for a tool.

2. The tool supply device of claim 1, wherein the touch element is a tappet.

3. The tool supply device of claim 1, wherein the touch switch is arranged in a support body.

4. The tool supply device of claim 1, wherein all detectors assigned to the plurality of receptacles are arranged in a horizontal plane.

5. The tool supply device of claim 1, wherein each receptacle of the plurality of receptacles has a recess in the tool carrier adapted to a shape of a specific tool.

6. The tool supply device of claim 1, wherein the holder element is a clamp-shaped holder element or a magnetic holder.

7. The tool supply device of claim 1, further comprising a data processing unit configured to receive a signal from the detector assigned to each receptacle of the plurality of receptacles, and to record and document removal and return of a tool.

8. The tool supply device of claim 7, wherein the data processing unit is configured to capture at least one of tool usage data, tool status data and tool user data.

9. The tool supply device of claim 7, further comprising a display configured to communicate with a data processing unit, and configured to display at least one of the presence of tools, the absence of tools, tool usage data and user data.

10. The tool supply device of claim 1, wherein the tool carrier comprises a soft foam insert.

11. The tool supply device of claim 1, wherein an outline of one or more tools is shown on the circuit board.

12. The tool supply device of claim 1, wherein several circuit boards are arranged next to one another on the bottom of the container.

13. The tool supply device of claim 12, wherein each circuit board of the several circuit boards has a module size adapted to dimensions of the container, so that the several circuit boards together cover the bottom of the container.

14. The tool supply device of claim 1, further comprising a cable carrying device arranged in the housing for electrical connecting lines.

15. The tool supply device of claim 1, further comprising a locking system configured to lock the container in the housing.

16. The tool supply device of claim 1, further comprising at least one of an actuator configured to actuate a locking bar, and a wireless communication module.

17. The tool supply device of claim 1, further comprising a signal element configured to signal the presence or absence of a tool in the container.

18. The tool supply device of claim 17, wherein the signal element is arranged in an edge protection element provided on the housing.

19. The tool supply device of claim 1, further comprising a signal element provided on the container or on a display.

20. The tool supply device of claim 1, further comprising at least one signal unit configured to signal at least one of the closed state of the tool supply device, a battery charge level of an electrical energy supply unit and the completeness of a tool inventory, wherein the signal unit is provided on a handle area or a functional area on the housing.

21. The tool supply device of claim 1, wherein the detector assigned to each receptacle of the plurality of receptacles has an electrical connector interface configured to receive an electrical plug element.

22. The tool supply device of claim 1, wherein the container is equipped with a weighing system which is coupled to a weight evaluation.

* * * * *